United States Patent
Mutaguchi et al.

[11] Patent Number: 6,035,787
[45] Date of Patent: Mar. 14, 2000

[54] VIBRATION DAMPING ARRANGEMENT FOR CABLE CAR

[75] Inventors: Masao Mutaguchi, Yostukaido; Kiyosi Kawase; Koji Tanida, both of Yokohama; Hitoshi Nakagawa, Funabashi; Yoshinobu Hiranishi, Chiba; Ichiro Tokumura, Funabashi, all of Japan

[73] Assignees: Ishikawajima Harima Heavy Industries, Co.; Nippon Cable Co., Ltd., both of Japan

[21] Appl. No.: 09/111,527

[22] Filed: Jul. 8, 1998

Related U.S. Application Data

[62] Division of application No. 08/586,083, Jan. 16, 1996, Pat. No. 5,778,797.

[30] Foreign Application Priority Data

Jan. 31, 1995 [JP] Japan ..................................... 7-34193
Jan. 31, 1995 [JP] Japan ..................................... 7-34194
Jan. 31, 1995 [JP] Japan ..................................... 7-34195

[51] Int. Cl.⁷ ..................................................... B61B 7/04
[52] U.S. Cl. ........................ 105/149.1; 105/148; 105/156; 188/378; 188/380
[58] Field of Search ............................. 105/148, 149.1, 105/149.2, 150, 156; 104/173.1, 180; 188/378, 379, 380

[56] References Cited

U.S. PATENT DOCUMENTS 2,618,492  11/1952  Singer .
4,238,104  12/1980  Hamilton ............................. 188/380

FOREIGN PATENT DOCUMENTS 618380    10/1994  European Pat. Off. .
1556470    3/1970  Germany .
1374415   11/1974  United Kingdom .

*Primary Examiner*—S. Joseph Morano
*Attorney, Agent, or Firm*—Rader, Fishman & Grauer PLLC

[57] ABSTRACT

A vibration damping arrangement for a gondola of a type having a supporting unit attached to a cable, a hanger suspended from the supporting unit and a carriage suspended from the hanger. A vibration damping device includes an elongated hollow housing. A bottom plate of the housing defines a down-wardly arcuate oscillation track which extends in a direction perpendicular to the cable. A vibration damping body is movably located on the oscillation track such that it can naturally oscillate on the oscillation track in the longitudinal direction of the oscillation track upon vibrations of the carriage. The vibration damping device is located under a seat inside the carriage, suspended from a bottom of the carriage, supported by the hanger above a roof of the carriage or mounted on the roof of the carriage in such a manner that it does not extend beyond width and length of the carriage. The vibration damping device does not substantially occupy a passenger room so that comfortableness is not degraded. A cover may be provided to house the vibration damping device thereby not affecting appearance of the gondola if the vibration damping device is located outside the carriage.

36 Claims, 28 Drawing Sheets

RELATION BETWEEN DAMPING APPARATUS (WEIGHT), GONDOLA AND EXTERNAL FORCE

——— EXTERNAL FORCE
----- GONDOLA
—·— DAMPING APPARATUS (WEIGHT)

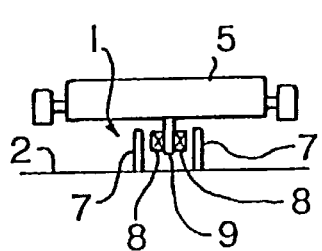 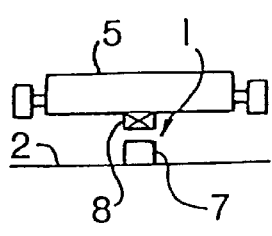 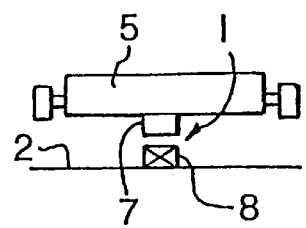
FIG. 17A     FIG. 17B     FIG. 17C
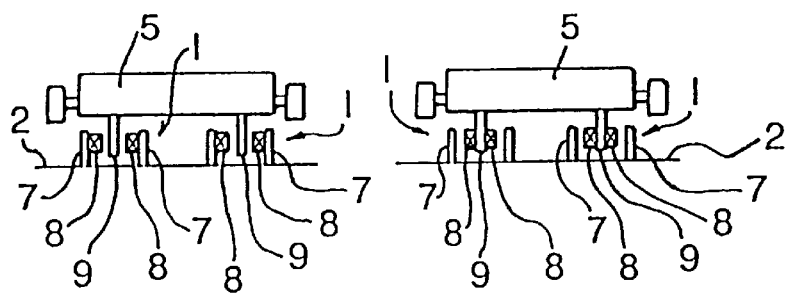
FIG. 17D     FIG. 17E
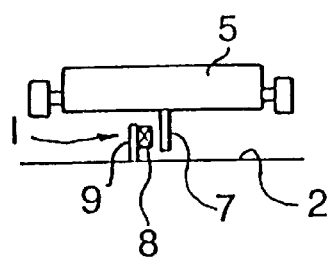 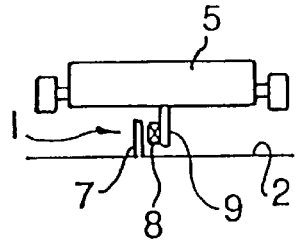 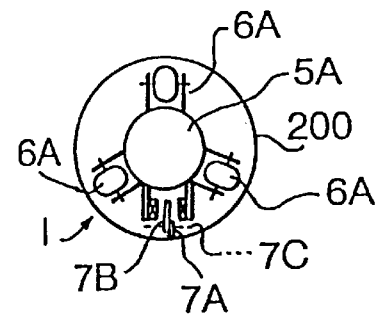
FIG. 17F     FIG. 17G     FIG. 17H
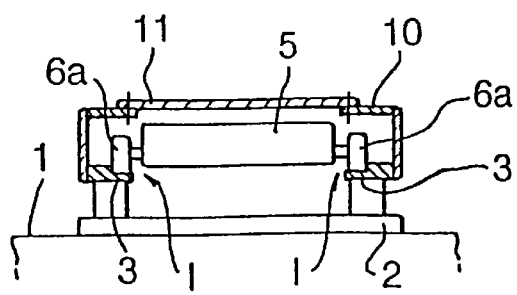
FIG. 18A

VIBRATION DAMPING ARRANGEMENT FOR CABLE CAR

This application is a division of Ser. No. 08/586,083, filed Jan. 16, 1996, now U.S. Pat. No. 5,778,797.

BACKGROUND OF THE INVENTION

1. Technical Field

The present invention relates to a vibration damping arrangement used for an apparatus moving along a cable (wire rope, ropeway, etc.) such as cable cars and gondolas of a type which generally includes a supporting device fixed or running on the cable, a hanger suspended from the supporting device and a passenger car suspended from the hanger.

2. Background Art

A cable car facility which includes a passenger car, a hanger for supporting the passenger car and a supporting device (e.g., a cable gripping unit or a traveling roller unit) for supporting the hanger and fixed or running on a cable is advantageous as compared with other transportation systems since it is economically constructed and is able to move in a steep track.

The cable gripping unit may be able to grasp and release the cable or it may be fixed on the cable permanently. The cable is endless and directly circulated by a separate drive. The drive is generally sprockets or pulleys provided at a lower station and an upper station. The endless cable is engaged over these pulleys. The cable car is moved together with the cable. One group of cable car facilities which employ such a cable gripping unit and the separate drive for moving the cable is generally categorized into a single-cable automatically-circulating type or a single-cable fixed carriage type. In the former type the cable gripping unit grasps and release the cable at predetermined positions, and in the latter case the cable gripping unit always holds the cable during conveyance. In either type, only one cable is used. There is another group of cable car facilities which employ more than one cable. In one type of this category, a traveling roller unit rolls on a stationary cable and a drive cable which is moved along the stationary cable is used to move the cable car. The carriage is suspended from the traveling roller unit. The drive cable pulls the traveling roller unit (and in turn the cable car) from the lower station to the upper station along the stationary cable. Generally two stationary cables are provided: one for conveyance from the lower station to the upper station and another for conveyance from the upper station to the lower station. In this case, one cable car is supported at each end of a U-shaped drive cable so that one cable car is pulled to the upper station along one stationary cable when the other cable car is lowered to the lower station along the other stationary cable. The drive for moving the drive cable is a pulley provided at the upper station. This is generally referred to as a reversible aerial tramway. In another type, a plurality of cable cars are fixed on an endless drive cable and the traveling roller units mounted on the cable cars roll on two stationary cables. The cable cars pulled to the upper station move along one stationary cable and the cable cars lowered to the lower station move along the other stationary cable. The drive for moving the drive cable is pulleys provided at the lower and upper stations.

All of these ropeway facilities use a supporting device (a cable gripping unit or a traveling roller unit) and the present invention pertains to any type of such ropeway facilities.

It can be said that the cable car is a single pendulum having its point of support (or a center of oscillation) at a certain point on the cable or on the cable car supporting device, and a cross wind causes the cable car to roll. Such rolling vibration results in uncomfortableness and uneasiness to people in the cable car and in turn stoppage of operation of the cable car to avoid accidents. Conventional cable car facilities have such problems in safety and cost performance. Recently, the cable cars are used not only for mountain side sightseeing but also for a general transportation system. Accordingly, an arrangement for attenuating vibrations of the cable car is desired strongly.

One of vibration damping apparatuses for the cable car is disclosed in Japanese Patent Application Publication No. 5-87183 entitled "Vibration Damping Apparatus". This vibration damping apparatus employs a gyro installed on the cable car for vibration damping and can logically attenuate the vibrations of the cable car. This vibration damping apparatus, however, requires a power source for a motor of the gyro. Generally, it is very difficult for the cable car to have an external power source. Therefore, the above idea is not practical.

Another consideration is needed for the vibration damping apparatus for the cable car: since various structures are provided along the cable and around boarding/stopping stations (e.g., lower, intermediate and upper stations) to drive the cable car along the cable, the vibration damping apparatus mounted on the cable car should not intervene with these structures. In case of a single-ropeway automatically-circulating cable car system, for example, a number of machines is provided at the stopping stations to accelerate/decelerate the cable car, grab/release the cable and open/close doors of the cable car. Along the cable track, provided are structures for supporting and guiding the cable with an appropriate tension and towers and arms for these structures. As mentioned earlier, an attachment (i.e., the vibration damping apparatus) on the cable car should not contact or excessively approach these accessories. In other words, the vibration damping apparatus may project above and below of a main body of the cable car to a certain extent but it is disadvantageous if it projects front, rear, left or right of the body of the cable car.

Another vibration damping apparatus for the cable car is disclosed in Japanese Patent Application Publication No. 6-280934 entitled "Dynamic Vibration Damping Apparatus For Pendulum-Type Structure". This apparatus is supported on a hanger above a roof of a carriage of a cable car (passenger car). The hanger downwardly extends from the cable to the passenger car. The vibration damping apparatus has a size which does not protrude from the passenger car in its width and length directions in the horizontal direction so that it does not intervene the nearby structures. However, this vibration damping apparatus employs a spring-and-mass type attenuator. Use of a spring makes adjustment of a natural period of a damping mass difficult. In addition, the damping mass cannot oscillate in a large stroke since its stroke is limited by the spring and a dashpot. Further, its maintenance is not easy.

SUMMARY OF THE INVENTION

An object of the present invention is to provide a vibration damping arrangement for a cable car which does not intervene with necessary facilities while maintaining vibration attenuation effect of a vibration attenuator.

Another object of the present invention is to provide a vibration damping arrangement which is easily applicable to an existing cable car.

Another object of the present invention is to provide a vibration damping arrangement which is applicable to any type of cable car.

Another object of the present invention is to provide a vibration damping arrangement which does not require an external power source.

Another object of the present invention is to provide a vibration damping arrangement which can attenuate vibrations quickly.

Another object of the invention is to provide a vibration damping arrangement which does not affect appearance of a cable car.

Another object of the invention is to provide a vibration damping arrangement for a cable car which does not degrade passenger comfortableness.

Still another object of the present invention is to provide a vibration damping apparatus of which natural period is easy to adjust.

Yet another object of the present invention is to provide a vibration damping apparatus which has a relatively simple structure.

Another object of the present invention is to provide a vibration damping apparatus of which maintenance is easy.

According to the present invention, there is provided a vibration damping arrangement for a cable car of a type having a passenger car suspended from a cable via a supporting device and a hanger characterized in that a vibration damping device is located at a position which does not intervene with other facilities necessary for operations of the cable car.

The supporting device may be a cable gripping unit or a cable traveling unit. The supporting device is provided on the cable, the hanger is suspended from the supporting device and the passenger car is suspended from the hanger.

The vibration damping device has a downwardly arcuate rail member and a damping weight movably located on the rail member. The rail member may be fixed on the cable car via a cushioning member. The rail member defines an oscillation track for the damping weight. The damping weight naturally oscillates on the rail member upon vibrations of the cable car. The rail member may have a hollow elongated box housing having a rectangular or square cross section or a hollow tubular housing having a circular cross section. The box or tubular housing defines a hollow space therein. The hollow space extends in the longitudinal direction of the rail member and the attenuation weight moves back and forth (or right and left) like a pendulum on an oscillation track formed inside the hollow space. The oscillation track may be defined by a pair of rails laid inside the hollow housing. The rail member may be an arcuate plate having a predetermined radius of curvature and end plates may be provided at the longitudinal ends of the plate. A bottom plate of the housing itself may serve as the rails. The attenuation weight may have wheels on its bottom and side rollers on its lateral surface. The damping weight oscillation track may be defined by a monorail. The transverse cross section of the attenuation weight may be circular, rectangular or square depending upon the transverse cross section of the hollow space of the rail member. This type of damping device is generally referred to as a passive type since the damping weight is not forced to oscillate by a separate drive. Since the damping weight moves naturally and the vibration damping device does not need an external power source, the vibration damping device is applicable to an existing cable car without considerable modifications and reconditioning. The rail member extends in a direction in which the cable car vibrates. Specifically, it extends in a direction perpendicular to the cable. The vibration damping device may be placed under a passenger seat inside the passenger car, suspended from a bottom of the passenger car, mounted on a top of the passenger car or supported above the passenger car. If the vibration damping device is placed inside the passenger car, it has a size which can be completely hidden under the seat. This vibration damping device does not affect appearance of the cable car and occupies substantially no space for passengers since it is under the seat. If the vibration damping device is placed outside the passenger car, it has a size which does not extend beyond the passenger car in a length direction as well as in a width direction of the passenger car. The vibration damping device outside the passenger car may be covered with a certain material to keep its appearance decent. If presence of the vibration damping device is not outstanding (generally the vibration damping device is hardly noticeable if mounted on or near the top of the cable car), the covering material may not be necessary. If the vibration damping device is provided above the passenger car, it may be supported by the hanger. In any case, the vibration damping device does not extend into the space for passengers. Therefore, the passenger room is not sacrificed in providing the vibration damping device and comfortableness is not degraded.

When the cable car vibrates in its width direction, the rail member fixed on the cable car also vibrates. This vibration energy is converted to a kinetic energy of the damping body which causes the damping body to move on the rail member. As a result, the vibration of the cable car is attenuated. By determining an appropriate radius of curvature of the arcuate oscillation track (i.e., rail member), the natural period of the damping body is set to be equal to that of the cable car. The natural period T is given by the equation $T=2\pi (R/g)^{1/2}$ where R represents a radius of curvature of the rail member. Therefore, it is easy to determine the natural period T since it is determined by the radius R. If the natural period of the cable car is known, the radius R can be determined, and the damping body will perform a single harmonic oscillation having a natural period determined by the above mentioned R. Since the cable car and the damping body resonate with each other, a large stroke of oscillation is achieved. Therefore, a quick vibration attenuation is realized. When the cable car oscillates in a large stroke, the vibration damping weight should also oscillate in a large stroke to quickly attenuate the oscillation. If a spring is attached to the vibration damping weight, the weight cannot move in a sufficiently large stroke.

The passenger car oscillates (i.e, rolling vibration) having the center of oscillation at a certain position on the cable or the supporting device mounted on the cable. Although the center of gravity of the cable car varies depending upon the number of passengers in the cable car, it generally exists inside the passenger room and approximately coincides with the center of gravity of the cable car itself. Therefore, the above mentioned R is the distance from the center of oscillation to the center of the gravity of the cable car, and the natural period T of the cable car is determine by this R. It is generally preferred to locate the vibration damping device at a position deviated from the center of gravity of the cable car. Under the seat and the bottom and top of the cable car are all distanced from the center of gravity of the cable car. The location of the vibration damping device is always shifted upward or downward from the center of gravity of the cable car in the present invention. Therefore, the vibration attenuation is achieved as desired. By changing the radius of curvature of the arcuate oscillation track for the damping weight, the natural period of the vibration damping device is changed. Thus, it is easy to change the natural period of the vibration damping device. Accordingly, it is possible to achieve an appropriate attenuation effect regardless of the location of the vibration damping device.

First and second magnets may be attached to the end plates of the track respectively and third and fourth magnets may be attached to the damping body at its opposite end faces. The first magnet on one end plate may have the same polarity as the third magnet on one end face of the damping body and the second magnet on the other end plate may have the same polarity as the fourth magnet on the other end face of the damping body. The magnet may be a permanent magnet or an electromagnet. If the damping body oscillates in an excessively large stroke and approaches the end plate, a repulsive force is generated by the two facing magnets having the same polarity and it prevents collision of the damping body against the end plate of the rail member. The vibration damping apparatus of the present invention does not need a mechanical element (i.e., spring) to adjust the natural period of itself, has a simple structure, and is able to cope with a large stroke of vibration. In addition, preventing the damping body from hitting the end plates reduces a loss in the damping efficiency. Such a magnetic collision avoidance mechanism lasts longer than a mechanical one and its maintenance is also easier.

It should be noted that only first and second cushioning or shock absorbing members (e.g., spring or rubber) may be provided on the end plates and nothing may be provided on the damping weight or only third and fourth cushioning members may be provided on the opposite end faces of the damping weight and no such members may be provided on the end plates. If the shock absorbing members are only provided on the end plates or the damping body, the damping body might collide with the end plates. However, shock upon collision is reduced by the shock absorbing members so that the vibration damping efficiency is not degraded significantly.

An air resistance plate may be attached to the bottom of the damping weight. This produces a braking force upon movement of the damping weight. The air resistance plate may be replaced with a propeller. Both the air resistance plate and the propeller can prevent excessive oscillation of the damping body, which excessive oscillation results in collision of the damping weight to the end plates of the rail member.

A magnet may be attached to the damping body and an element which is attracted by the magnet may be mounted on the rail member so that a braking force is applied to the damping body. The magnet may be a permanent magnet or an electromagnet. This also prevents the damping weight from oscillating in an over-stroke.

BRIEF DESCRIPTION OF THE DRAWINGS

FIGS. 17A to 17G illustrate sectional views of modification of a magnetic damping device respectively;

FIG. 17H illustrates a schematic sectional view of another magnetic damping device employed when a cylindrical damping body moves in a cylindrical casing;

FIG. 18A shows another modification of the vibration damping apparatus of the present invention;

DESCRIPTION OF THE PREFERRED EMBODIMENTS

Now, preferred embodiments of the present invention will be described with reference to the accompanying drawings.

First Embodiment

The first embodiment of the present invention deals with a cable car facility or gondola 101 of a single-cable automatically circulating type using a cable gripping unit 103 as a supporting means 102 and will be described with reference to FIGS. 1 to 5D.

Figure 1:
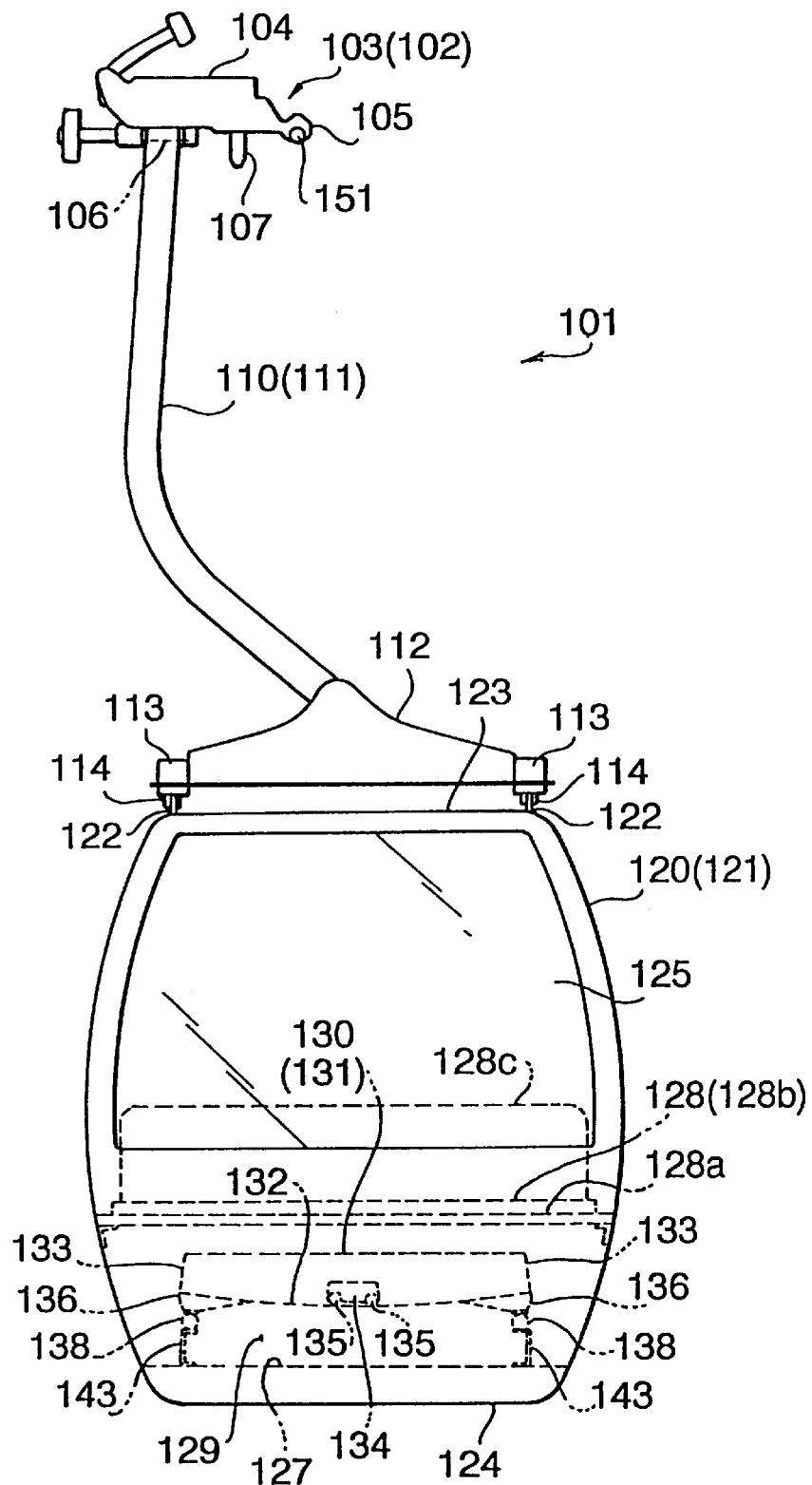
FIG. 1 illustrates a front view of a cable car equipped with a vibration damping apparatus according to the present invention (first embodiment)
Figure 2:
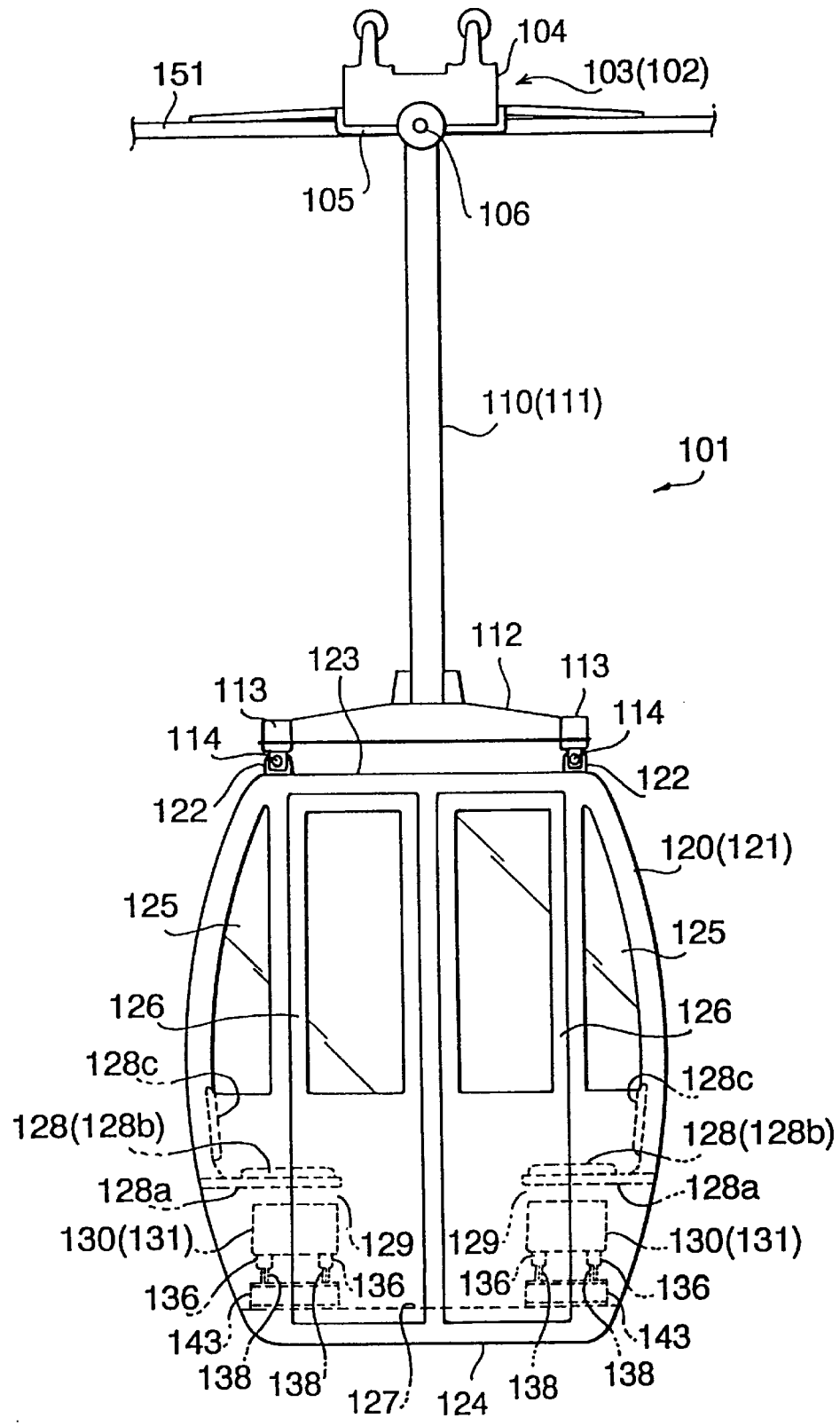
FIG. 2 is a lateral view of the cable car shown in FIG. 1.

Referring to FIG. 1, the gondola facility 101 includes the cable gripping unit 103 (i.,e., the supporting means 102) for holding a cable 151, a hanger 110 suspended from the cable griping unit 103, a passenger car 120 suspended from the hanger 110 and a couple of vibration damping devices 130 placed in parallel to each other inside the passenger car 120 (FIG. 2). The cable gripping unit 103 generally extends in a horizontal direction from the cable 151 in a width direction of the passenger car 120 and has a gripping portion 105 at an end of its main body 104. The gripping portion 105 grasps the cable 151 resiliently by a spring (not shown). This type of grip is known as a spring-type. The main body 104 of the griping unit 103 extends from the cable 151 in a generally horizontal direction. On a lower surface of the gripping unit main body 104, fixed is a pin 106 to pivotably support an upper end of the hanger 110. The pivotable connection at the pin 106 enables both the hanger 110 and the passenger car 120 supported by the hanger 110 to always take a vertically suspended posture. A roller 107 is also provided on the lower surface of the main body 104 of the gripping unit 103.

The hanger 110 is suspended from the gripping unit 103. The hanger 110 has a gently bent and downwardly extending main portion 111 and a lower frame 112 extending generally horizontally. A lower end of the main portion 111 is joined with an approximate center of the lower frame 112. An upper end of the main body 111 is supported by the gripping unit 103. The lower frame 112 is elongated in the width direction of the passenger car 120. The main portion 111 may be made from a tubular member having a square or rectangular cross section. Cylindrical members 113 are fixed at ends of the lower frame 112. A rod 114 downwardly extends from each cylindrical member 113, and a connection member 122 of the passenger car 120 is engaged with each rod 114. The connection members 122 are provided at a top 123 of the passenger car 120. The passenger car 120 is suspended from the hanger 110 at the connection members 122.

The hanger 110 extends straight as viewed from its lateral side (FIG. 2).

The passenger car 120 has a body structure 121 which defines front and rear walls as well as right and left walls of the passenger car. The passenger car 120 also has the roof 123 and a bottom wall 124. The passenger car 120 is a closed carriage. Like an ordinary gondola, the passenger car 120 has windows 125 for view watching and doors 126 for boarding (FIG. 2). Inside the carriage 120, a floor plate 127 is provided on which passengers stand. Also, opposite front and rear seats 128 are provided in the carriage 120 (FIG. 2). Each seat 128 extends in a direction perpendicular to the cable 151. Referring to FIG. 2, each seat 128 includes a seat frame 128a, a seat plate 128b mounted on the seat frame and a back plate 128c. The front and rear seats 128 have the same structure and the passengers face each other when they are seated on the front and rear seats 128.

Figure 4:
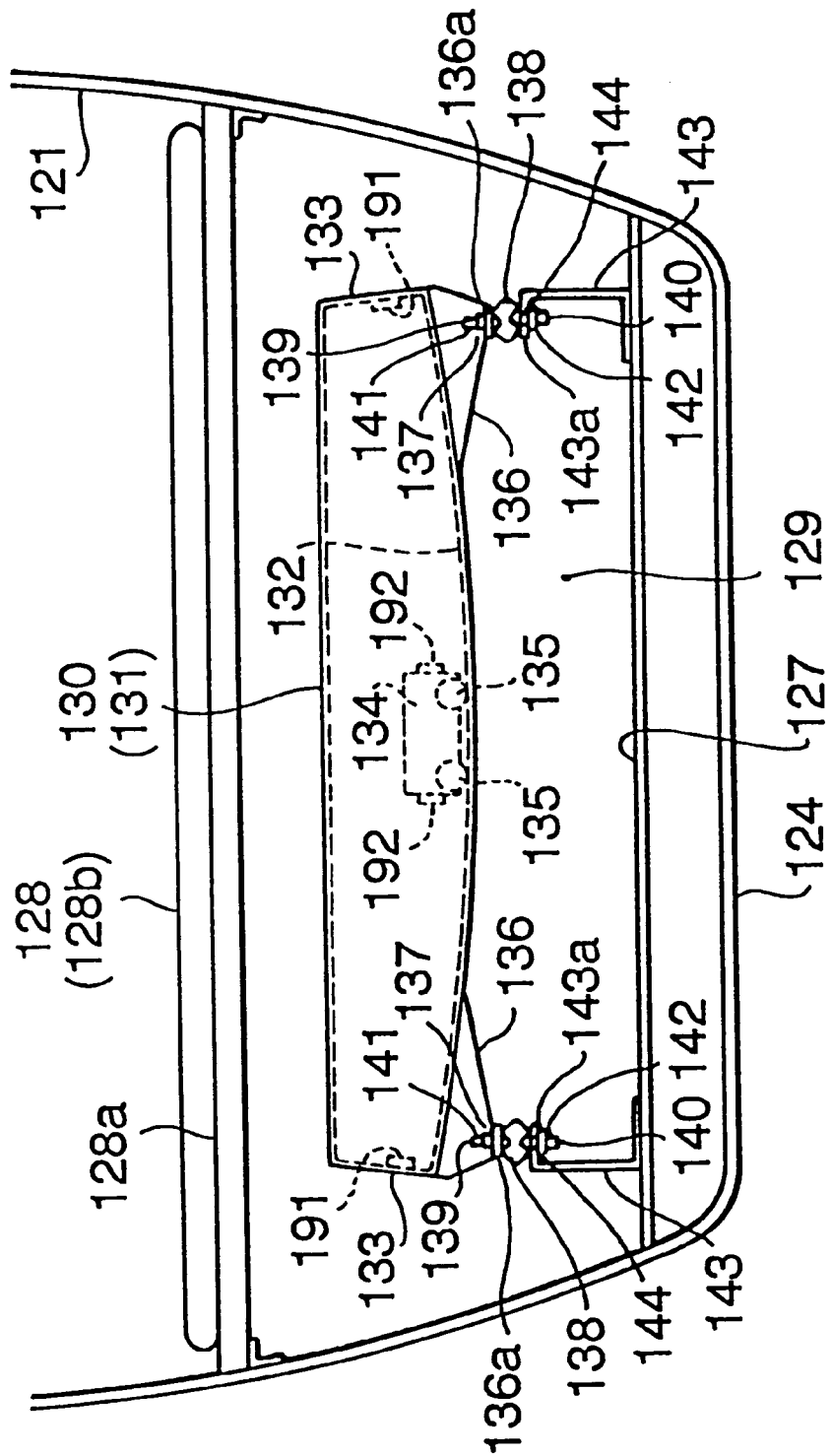
FIG. 4 is an enlarged view of part of FIG. 1 illustrating a detail relation between the vibration damping device and the passenger seat.
Figure 4A:
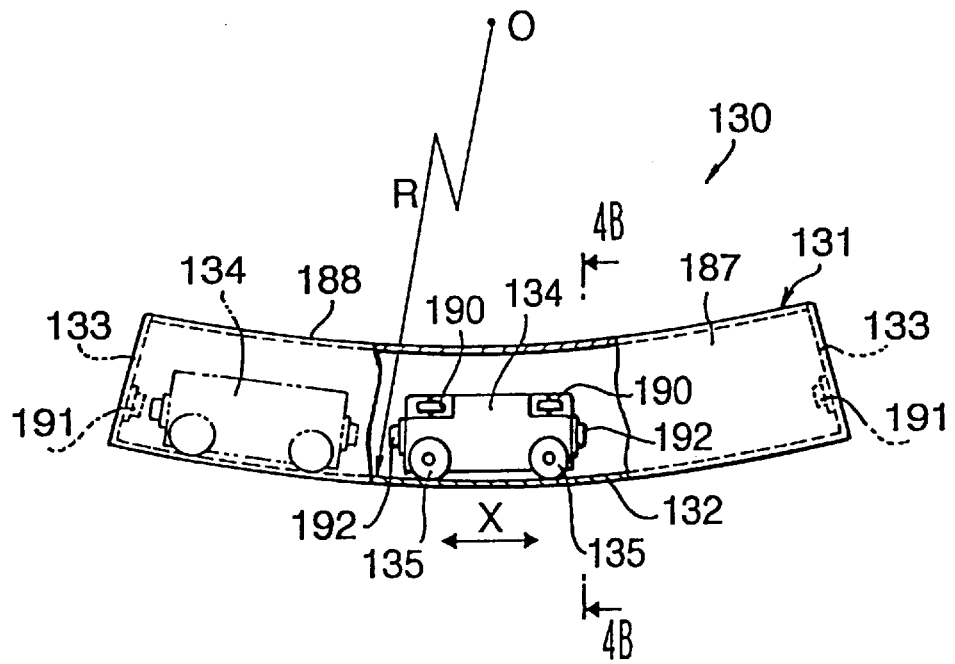
FIG. 4A shows a front view of the vibration damping device.
Figure 4B:
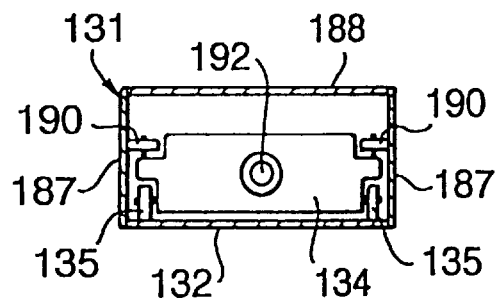
FIG. 4B illustrates a sectional view taken along the line A—A in FIG. 4A.

Referring to FIG. 4, a vibration damping device 130 of the present invention has a hollow closed casing 131 which extends in a width direction of the passenger car 120 and has a rectangular cross section. A damping weight 134 having rollers or wheels 135 is oscillatably located in the casing 131. This vibration damping device is a so-called passive type one. The longitudinal direction of the vibration damping device 130 is a direction in which the gondola 101 or the passenger car 120 vibrates. Details of the vibration damping device 130 is illustrated in FIGS. 4A and 4B. Referring to FIGS. 4A and 4B, the bottom plate of the casing 131 is an arcuate rail plate 132 having a predetermined radius of curvature R. The center O of the radius R is positioned above the casing 131. The rail plate 132 extends in a direction in which the gondola 101 vibrates ("X" directions in FIG. 4A). On the rail plate 132, provided is the damping body (i.e., damping weight or mass) 134 having the wheels 135. The damping body 134 is adapted to be able to freely move right and left like a pendulum on the rail plate 132. When the damping mass 134 moves on the rail plate 132, its wheels 135 roll on the rail plate 132. End plates 133 are provided at longitudinal ends of the rail plate 132. These end plates 133 are stopper plates for the damping mass 134. Lateral plates 187 vertically stand from front and rear edges of the rail plate 132 (FIG. 4B). The space defined by the rail plate 132, the end plates 133 and the lateral plates 187 is closed by a top plate 188. As a result, a hollow box-shaped casing 131 is formed. The damping mass 134 reciprocally moves in this casing 131. The damping mass 134 also has side rollers 190 as best seen in FIG. 4B. These side rollers 190 roll on the lateral walls 187 when the damping mass 134 oscillates inside the casing 131. The vibration damping apparatus of the present invention is a passive vibration damping apparatus having the damping mass 134 which naturally moves like a pendulum on the rail plate 132 upon vibrations of the gondola 101.

A magnet 191 is attached to an inner face of each end plate 133 and another magnet 192 is attached to each end face of the damping mass 134. A non-magnetic plate may be interposed between the magnet and the end plate and between the magnet and the damping mass. In FIG. 4A, the magnet 191 on the left end plate 133 has the same polarity of the magnet 192 on the left end face of the damping mass 134, and the magnet 191 on the right end plate 133 has the same polarity of the magnet 192 on the right end face of the damping mass 134. Consequently, if the damping mass 134 oscillates in a large amplitude and approaches the end plate 133 of the casing 131, a repulsive force is generated between the two facing magnets (one on the end plate and one on the damping mass). Therefore, collision of the damping mass against the end plates 133 is prevented. The magnets 191 and 192 form in combination a collision avoidance unit.

It should be noted that the magnets 191 and 192 may be permanent magnets or electromagnets. More than one magnet may be attached to the end plate and the damping mass. The casing 131 shown in FIG. 4B has a rectangular cross section but it may have a square cross section or a circular cross section. Further, the casing 131 may not a completely closed casing. Referring to FIG. 4I, for example, the bottom of the casing 131 may be formed by a pair of guide rails 132a extending in the longitudinal direction of the casing 131 and the middle area of the bottom may be open to the air. In this case, the damping weight 134 may have wheels 135 but may not have side rollers 190. In addition, the top plate 188 of the casing 131 may be detachably provided as illustrated in FIG. 4I. Furthermore, a monorail 168 may be employed as shown in FIG. 4J. In this case, the damping body 134 may have a plurality of rollers 135b. The monorail 168 may be provided in the casing 131 or without the casing 131. In the latter case, the monorail 168 may be mounted on the floor 127 of the passenger car 120 or supporting members 143 (FIG. 1).

When the gondola 101 vibrates upon an external force such as a wind, the casing 131 also vibrates since these are integrated by casing pedestals 136, cushion members 138 and supporting members 143 (FIG. 1). Therefore, energy of the oscillating rail plate 132 of the casing 131 is transmitted to the damping body 134 and the damping body 134 is naturally caused to perform a single harmonic oscillation. This oscillation of the damping body 134 occurs in a 90-degree delayed phase relative to the vibrating gondola 101, with the natural period of the damping body being equal to that of the gondola 101. Therefore, the damping body 134 reciprocally moves on the rail plate 132 in the longitudinal direction of the rail plate 132 with a large stroke and the vibration of the gondola 101 is quickly damped.

The gondola 101 vibrates in a 90-degree delayed phase relative to the external force, and the damping body 134 vibrates in a 90-degree delayed phase relative to the gondola 101. Thus, there is a 180-degree phase difference between the damping body 134 and the external force, and the external force is counterbalanced by the oscillation of the damping body 134 (see FIG. 4H).

By appropriately determining the radius of curvature R of the rail plate 132, it is possible to make the natural period of the damping body 134 equal to that of the gondola 101. The natural period T of the damping weight 134 is given by the equation $T=2\pi (R/g)^{1/2}$ so that it is determined by the radius R of the rail plate 132. R is obtained if the natural period of the gondola 101 is known. The damping body 134 performs a single harmonic oscillation having a natural period determined by this R. The gondola 101 and the damping body 134 resonate with each other so that the damping body 134 oscillates in a sufficiently large stroke. If the gondola 101 vibrates in a large stroke, the damping weight 134 should also vibrate in a large stroke to quickly attenuate the vibrations.

If the damping body 134 oscillates in a too large stroke, it may collide with the end plates 133. Such collision greatly degrades the vibration damping efficiency since the damping body 134 moves non-linearly and its oscillation does not occur in a desired relationship relative to the oscillation of the gondola 101. The vibration damping apparatus of the present invention, however, employs the collision avoidance unit (i.e., magnets 191 and 192 mounted on the end plates 133 and the damping body 134) so that an appropriate repulsive force is generated between the end face of the damping body 134 and the end plate 133 upon approach to the end plate. Therefore, the collision is prevented and the vibration damping effect is not weakened. The repulsive force is adjusted by changing a magnetic flux produced by the magnets 191 and 192. If the magnets are permanent magnets, the number of the magnets is increased or decreased. If the magnets are electromagnets, then an excitation current applied thereto is varied. The collision avoidance unit 191 and 192 is a magnetic unit, not a mechanical unit, so that deformations of the unit do not occur and its maintenance is easier.

It should be noted that the magnets 192 may be mounted on a top face or a bottom face of the damping body 134. Likewise, the magnets 191 may be attached to the rail plate 132, the lateral plate 187 or the top plate 188 of the casing 131. It should also be noted that the location of the vibration damping apparatus is not limited under the seat 128 or inside the passenger car 120 as long as it is deviated from the center of gravity of the gondola 101.

Figure 4C:
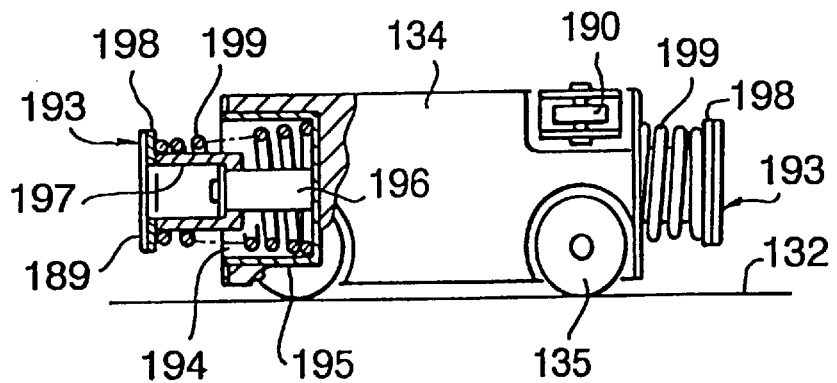
FIG. 4C illustrates a modification of the vibration damping apparatus.

FIG. 4C illustrates another embodiment of the vibration damping device of the present invention. The vibration damping device of this embodiment is similar to that shown in FIGS. 4A and 4B. Instead of providing the magnets 191 and 192 on the end plates 133 and the damping body 134 respectively, cushioning elements 193 are mounted on either the end plates 133 only or the damping body 134 only. FIG. 4C shows the cushioning elements 193 provided on the damping body 134. Each cushioning element 198 includes a cylindrical spring case 195 embedded in one end face of the damping body 134 to form an opening or space 194 in the end face, a fixed center rod 196 extending generally horizontally along a center axis of the spring case 195, a cylindrical plunger 197 slidably fitted over the center rod 196, a coil spring 199 placed between a flange 198 of the plunger 197 and a bottom plate of the spring case 195. The coil spring 199 may be linear or non linear. The plunger 197 is biased outwardly by a resilient force exerted by the coil spring 199. Numeral 189 designates a rubber attached to the exposed face of the plunger 197. The rubber 189 softens shocks and reduces noise upon contact between metallic members. It should be noted that this rubber 189 may not be provided in a certain application.

No repulsion force is generated until the damping body 134 hits the end plate in the embodiment shown in FIG. 4C so that the damping body 134 may collide with the end plate (or stopper plate) 133 if it oscillates in a large stroke. However, the shock upon the collision is reduced by the cushioning elements 193 so that the vibration damping effect of the vibration damping apparatus is not greatly degraded (or it is maintained at a tolerable level).

Figure 4D:
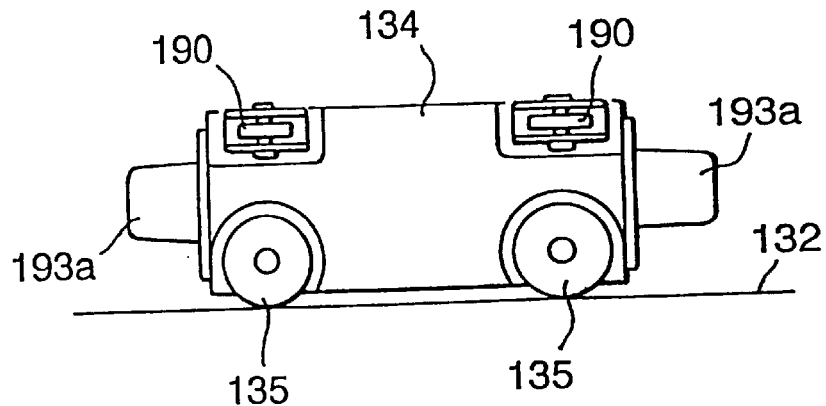
FIG. 4D illustrates another modification of the vibration damping apparatus.

FIG. 4D shows a modification of the cushioning element. Instead of the spring cushions 193, rubber cushions or a gel member cushions 193a are attached to the end faces of the damping body 134. A vibration damping effect similar to that of FIG. 4C is achieved.

It should be noted that the cushion members may be provided both on the end plates 133 of the casing 131 and the end faces of the damping weight 134. It should also be noted that no cushioning members may be provided if the oscillation track is sufficiently long and the damping weight 134 will not collide with the end plates 133 of the casing 131.

Figures 4E, 4F:
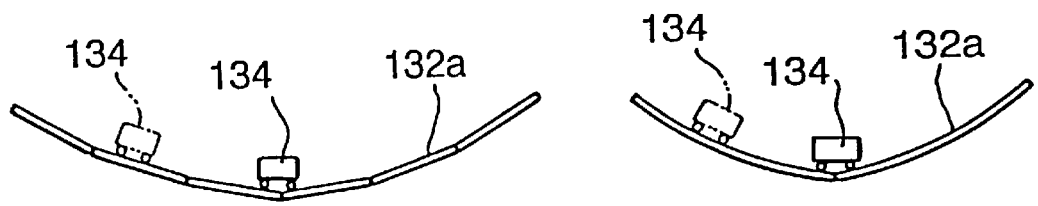
FIGS. 4E and 4F show another embodiment of a rail member respectively.

It should further be noted that the rail plate 132 is not limited to the one having a completely smooth surface shown in FIG. 4A as long as its center area is lower than its ends and ensures a decent oscillating movement of the damping body 134. For example, a rail 132a made from a plurality of straight segments as shown in FIG. 4E and a V-shaped rail 132b made from two curved rail segments as shown in FIG. 4F are satisfactory.

Figure 4G:
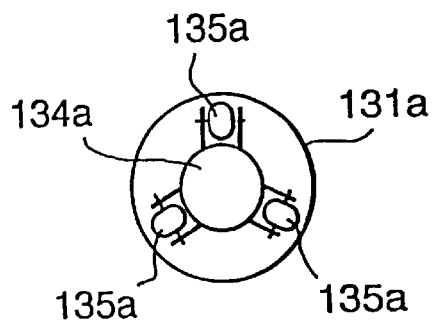
FIG. 4G depicts a schematic transverse section of a modification of the vibration damping apparatus.

It should also be noted that the casing 131 may have a tubular shape as depicted in FIG. 4G. This tubular casing 131a has a front view similar to FIG. 4A but its transverse section is circular as illustrated in FIG. 4G. The transverse section of the damping body 134a placed inside the casing 131a is also circular. The damping body 134a may have a plurality of rollers 135a on its surface so that it can move in the longitudinal direction of the casing 131a (a direction perpendicular to the drawing sheet).

Figure 16:
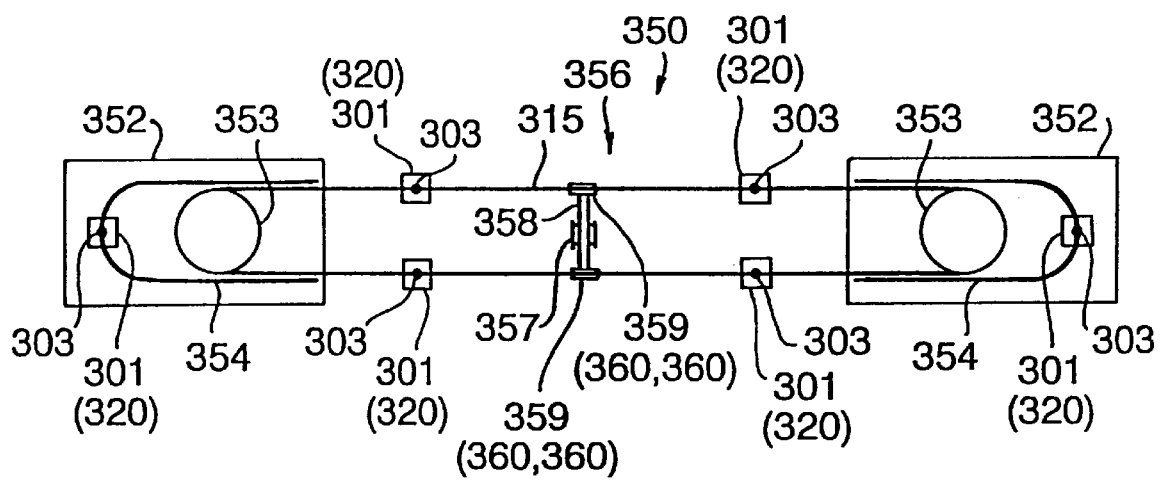
FIG. 16 is a schematic top view of a gondola facility showing movements of the cable car of a single-cable automatically-circulating type.
Figure 16A:
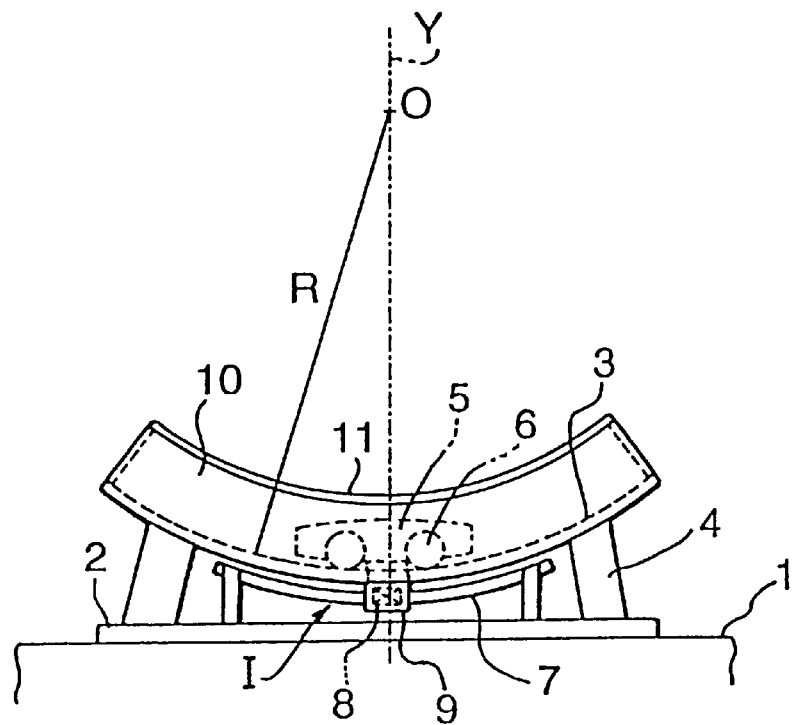
FIG. 16A depicts a front view of a vibration damping device according to another embodiment of the present invention.
Figure 16B:
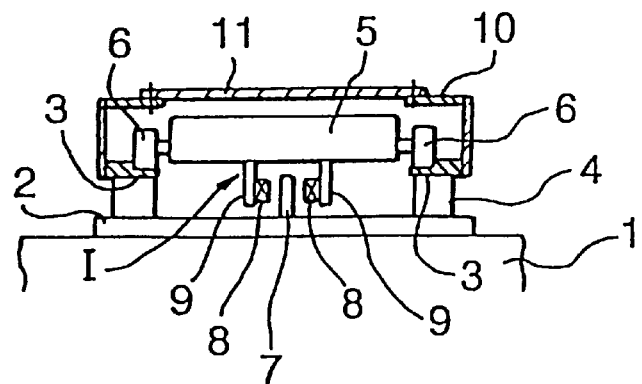
FIG. 16B depicts a transverse section of the vibration damping device shown in FIG. 16A.

FIGS. 16A and 16B illustrate another embodiment of the vibration attenuation apparatus according to the present invention.

A base frame 2 is fixed on a floor 1 of a carriage of a gondola, and a pair of parallel guide rails 3 having pedestals 4 are placed on the base frame 2. Each guide rail 3 is arcuate and has a radius of curvature R. The center of the radius 0 is above the guide rail 3. The longitudinal direction of the rail 3 coincides with a direction in which the carriage 1 vibrates. A damping mass 5 having wheels 6 is placed on the guide rails 3. These wheels 6 roll on the guide rails 3 when the damping mass 5 moves. As best seen in FIG. 16B, a plate 7 stands on the base frame 2 between the pedestals 4. Referring to FIG. 16A, the plate 7 has an arcuate upper portion adapted to the curvature of the guide rail 3. Referring again to FIG. 16B, two mounting plates 9 hang from the bottom face of the damping mass 5 and magnets 8 are attached to inner surfaces of the mounting plates 9. The plate 7 is sandwiched by the magnets 9 at a certain clearance. The magnets 8 are magnetic force holding members. The magnets 8 and the plate 7 form in combination a magnetic damper I. In FIG. 16B, an upside-down L-shaped member 10 is connected with an outer edge of each guide rail 3 to define a C-shaped space enclosing each wheel 6. These two members 10 are joined by a top member 11. As illustrated in FIG. 16A, each cover 10 has the same length as the guide rail 3 in its front view. The vibration damping apparatus is a passive type: the weight 5 naturally moves right and left on the guide rails 3 upon vibrations of the gondola 1.

The magnets 8 may be permanent magnets or electromagnets. The number of the magnets 8 may vary depending upon circumstances. The plate 7 may be a copper plate or a ferrite plate.

If the carriage 1 is vibrated by an external force, the guide rails 3 and the pedestals 4 also vibrate since they are integrated via the base frame 2. Therefore, the oscillating energy of the guide rails 3 is transferred to the damping weight 5 and the weight 5 naturally performs a single harmonic oscillation with the same natural period as the carriage 1. The damping weight 5 moves like a pendulum on the rails 3 in a large stroke so that the vibration of the carriage 1 is quickly attenuated.

Figure 4H:
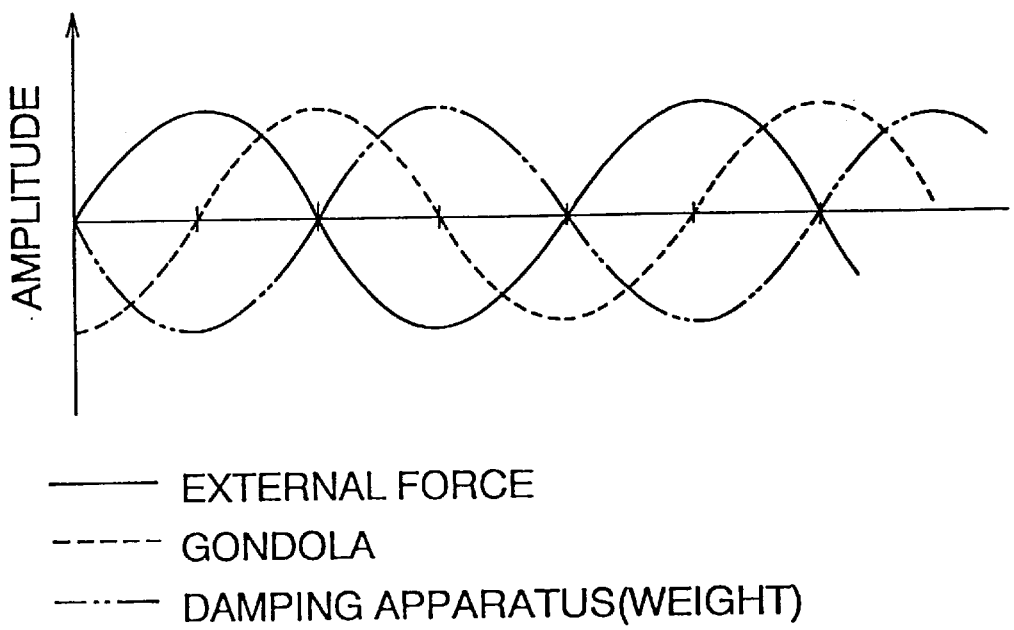
FIG. 4H depicts a phase relation between a vibration damping body, a cable car and an external force.
Figure 4I:
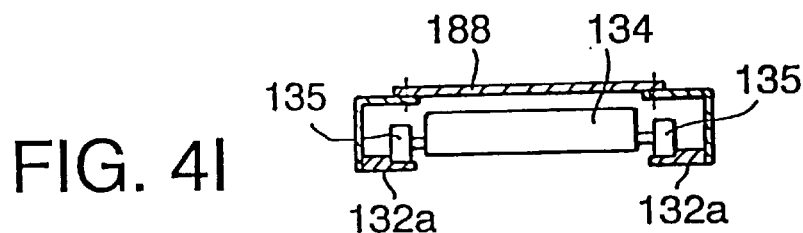
FIG. 4I depicts a transverse section of another vibration damping apparatus.
Figure 4J:
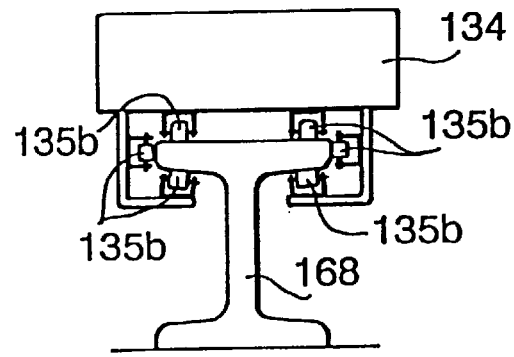
FIG. 4J illustrates a transverse section of still another vibration damping apparatus.

The carriage 1 vibrates in a 90-degree delayed phase relative to the external force. The damping weight 5 vibrates in a 90-degree delayed phase relative to the carriage 1. Therefore, there is a 180-degree phase difference between the damping weight 5 and the external force. As a result, the vibration of the external force is counterbalanced by the oscillation of the weight 5 (FIG. 4H).

By appropriately determining the radius of curvature R of the guide rail 3, it is possible to set the natural period of the damping weight 5 to be equal to that of the carriage 1. The natural period T of the damping body is given by the equation $T=2\pi (R/g)^{1/2}$ so that it is determined by the radius R of the guide rail 3. R is obtained if the natural period of the carriage (gondola) 1 is known. The damping body 4 performs a single harmonic oscillation having a natural period determined by this R. The carriage 1 and the damping weight 5 resonate with each other so that the damping weight 5 oscillates in a sufficiently large stroke.

Figure 22A:
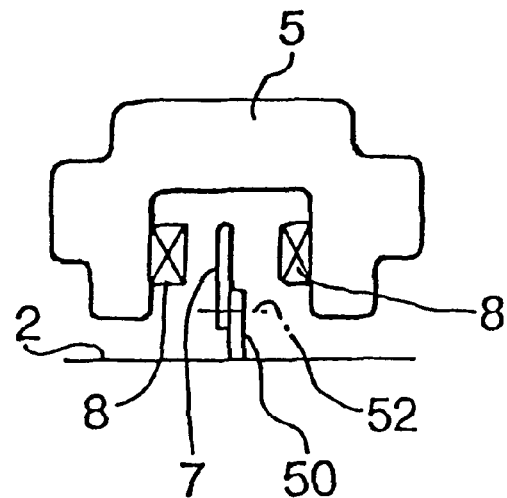
FIGS. 22A and 22B show a modification of a magnetic damping device.
Figure 22B:
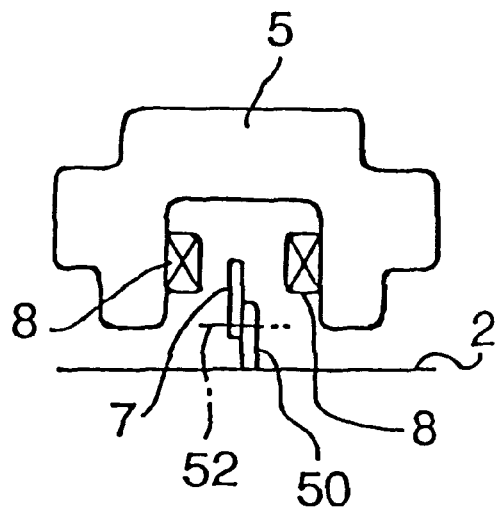

The damping weight 5 might oscillate in a too large stroke since it resonate with the gondola 1. However, the vibration damping apparatus of the present invention is equipped with the magnetic damper I to prevent an excessive oscillation of the damping weight 5. Specifically, if the magnets 8 generate a magnetic flux and the weight 5 oscillates, the plate 7 attached to the bottom face of the weight 5 passes through the magnetic flux. This movement generates an eddy current in the plate 7 and results in an electromagnetic force (braking force) which is directed to a direction opposite the movement of the plate 7 (Fleming's right hand rule). Therefore, the oscillating movement of the weight 5 is braked and the weight 5 does not move in an over stroke. The vibration damping apparatus of the present invention can not only reduce the vibration of the gondola 1 but also restrict the over-stroke of the weight 5. The braking force applied to the damping weight 5 is controlled by adjusting the magnetic flux of the magnets 8. If the magnets 8 are permanent magnets, then the number of the magnets is increased or decreased and/or the relative position of the plate 7 and the magnets 8 is changed. The relative position is how the plate 7 is exposed in the magnetic flux. FIG. 22A shows the plate 7 more exposed in the magnetic flux and FIG. 22B shows the plate 7 less exposed in the magnetic flux. Specifically, the plate 7 is lowered and less area of the plate 7 faces the magnets 8 in FIG. 22B as compared with FIG. 22A. The braking force applied to the plate 7 (i.e., the damping weight 5) is greater in FIG. 22A than in FIG. 22B. Numeral 50 designates a support plate for the plate 7 and numeral 52 designates a pin to hold the plate 7 at a desired height. The location or height of the plate 7 is adjustable by the support 50 and the pin 52. FIGS. 22A and 22B show a weight similar to the one 4 shown in FIG. 4B (wheels 5 and side rollers 10 are omitted). If the magnets 8 are electromagnets, then the excitation current applied thereto is adjusted to control the braking force against the damping weight. Therefore, an appropriate braking force is applied to the damping weight 5. This braking unit I is a magnetic unit, not a mechanical unit, and it has a simple structure so that its maintenance is easier.

It should be noted that the location of the magnets 8 and the plates 7 and 9 of the magnetic damper I is not limited to the one illustrated in FIGS. 16A and 16B. FIGS. 17A to 17G illustrate various modifications of the magnetic damper I. In FIG. 17A, two magnets 8 are attached to front and rear faces of a single plate 9 hanging from the bottom of the weight 5 and are exposed to two plates 7 standing on the base frame 2. In FIG. 17B, a single magnet 8 directly adheres on the bottom of the damping weight 5 and a single plate 7 stands on the base frame 2 below the magnet 8 so that the magnet 8 and the plate 7 vertically face each other. In FIG. 17C, the locations of the magnet 8 and the plate 7 are exchanged from those of FIG. 17B. In FIG. 17D, two plates 7 hang from the bottom of the damping weight 5 and each plate 7 is sandwiched by a pair of magnets 8 attached to support plates 9 standing on the base frame 2. Two sets of magnetic damper I are spacedly provided. In FIG. 17E, two sets of the magnetic damper I shown in FIG. 17A are spacedly provided. In FIG. 17F, one plate 7 hangs from the damping weight 5 and one magnet 8 faces the plate 7. The magnet 8 is attached to a support plate 9 vertically extending from the base frame 2. FIG. 17G shows a modification of FIG. 17F: the location of the magnet 8 and the plate 7 are reversed.

Figure 17:
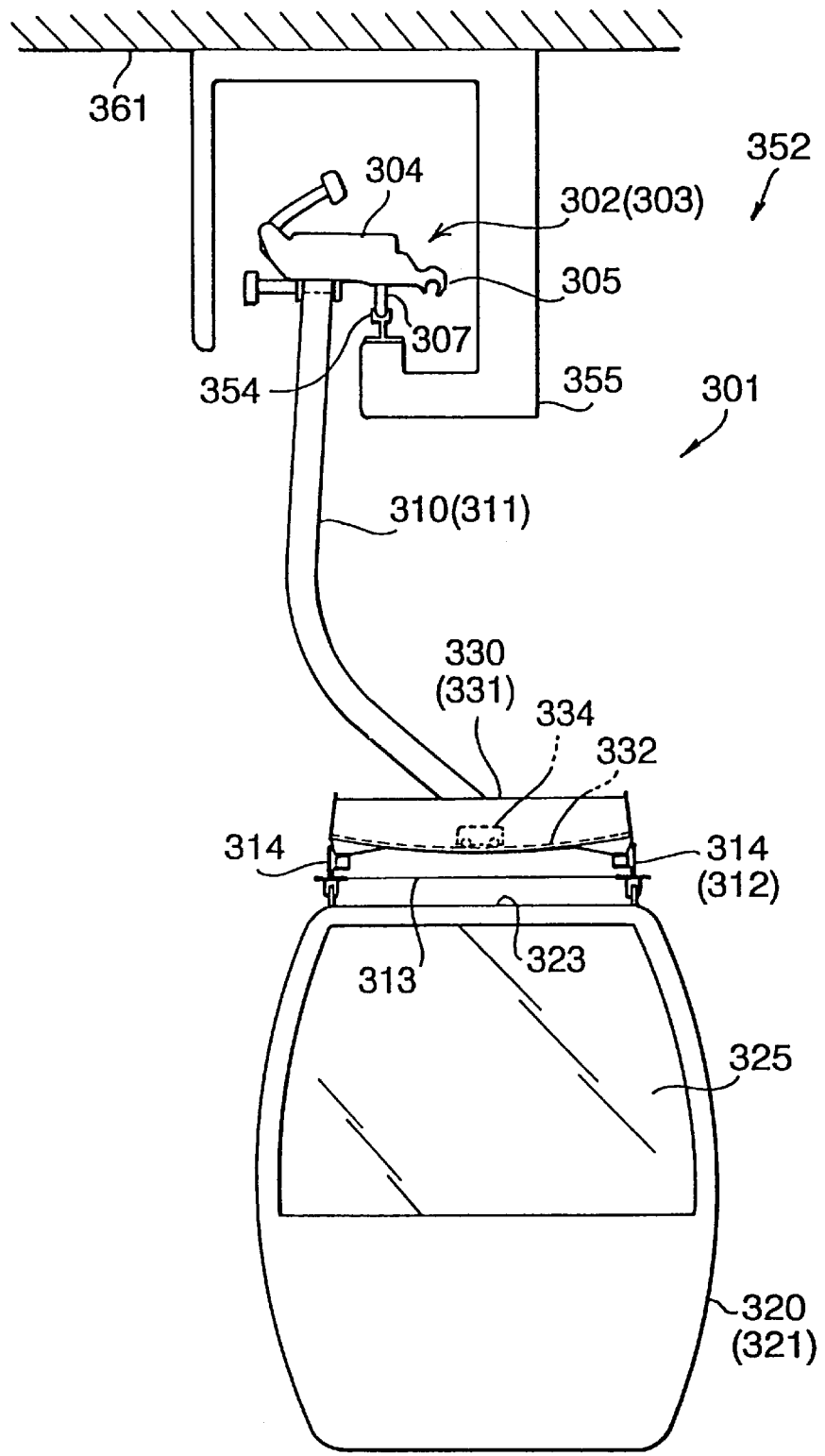
FIG. 17 shows a positional relationship between a slow-down rail, a boarding/stopping station frame and the cable car.

FIG. 17H illustrates a modification of the damping weight casing and the attenuation weight. As illustrated, the casing 200 is circular in its transverse section and the attenuation weight 5A is also circular in its transverse section. A magnetic damper I is provided, too. It should be noted that the transverse section of the casing shown in FIG. 16B is substantially rectangular. This rectangle is defined by the base frame 2, the pedestals 4, the guide rails 3, the covers 10 and the top plate 11. The attenuation weight 5 also has a rectangular transverse section in FIG. 16B. In FIG. 17H, a tubular casing 200 is employed and the weight 5A has a shape conforming with the shape of the casing 200. The attenuation weight 5A has, for example, nine rollers 6A (only three are illustrated in FIG. 17H) on its peripheral wall. These rollers 6A contact an inner wall of the tubular casing 200 and allow the attenuation weight 5A to reciprocally move in the tubular casing 200 in the longitudinal direction of the casing 200 (a direction perpendicular to the drawing sheet of FIG. 17H). The magnetic damper I may be any of those illustrated in FIGS. 16B to 17G. In FIG. 17H, employed is a magnetic damper similar to the one depicted in FIG. 16B: two magnets hang from the weight 5A and a single plate 7B is positioned therebetween. It should be noted here that the plate 7B is attached to another plate 7A fixed on the casing 200 and the plates 7A and 7B are joined by a pin 7C. The plate 7B is detachable from the plate 7A so that the height or location of the plate 7B relative to the magnets 5 is adjustable in this embodiment. Changing the relative location of the plate 7B results in change in an eddy current generated in the plate 7B and in turn change in an attenuating force to be generated by the magnetic damper I. A front view of the embodiment shown in FIG. 17H is similar to FIG. 16A. The casing 200 has an arc shape of which center area is lower than ends. The tubular casing 200 makes the vibration damping apparatus compact.

All the embodiments shown in FIGS. 17A to 17H operate in a similar manner as the embodiment of FIGS. 16A and 16B.

It should be noted that in the front view of the vibration damping apparatus, the number of the magnet 8 is only one, as best seen in FIG. 16A. However, there may be provided a plurality of magnets 8 in the longitudinal direction of the rails 3.

FIG. 18A illustrates another modification of the embodiment shown in FIGS. 16A and 16B. Like in FIG. 4I, this vibration damping apparatus has a base frame 2 fixed on a floor of gondola 1, lateral walls 10, a top cover 21, a pair of parallel guide rails 3 having pedestals fixed on the base frame 2 and a damping weight 5 having wheels 6a and movably placed on the rails 3. The difference is that separate magnets 8 and plates 7 are not provided: the wheels 6a serve as magnets and the rails 3 serve as the plates 7. In other words, the magnetic damper I is formed by the wheels 6a and the guide rails 3 in FIG. 18A. This arrangement does not need separate magnets 8 and plates 7 so that the structure of the vibration damping apparatus becomes simpler.

Figure 18:
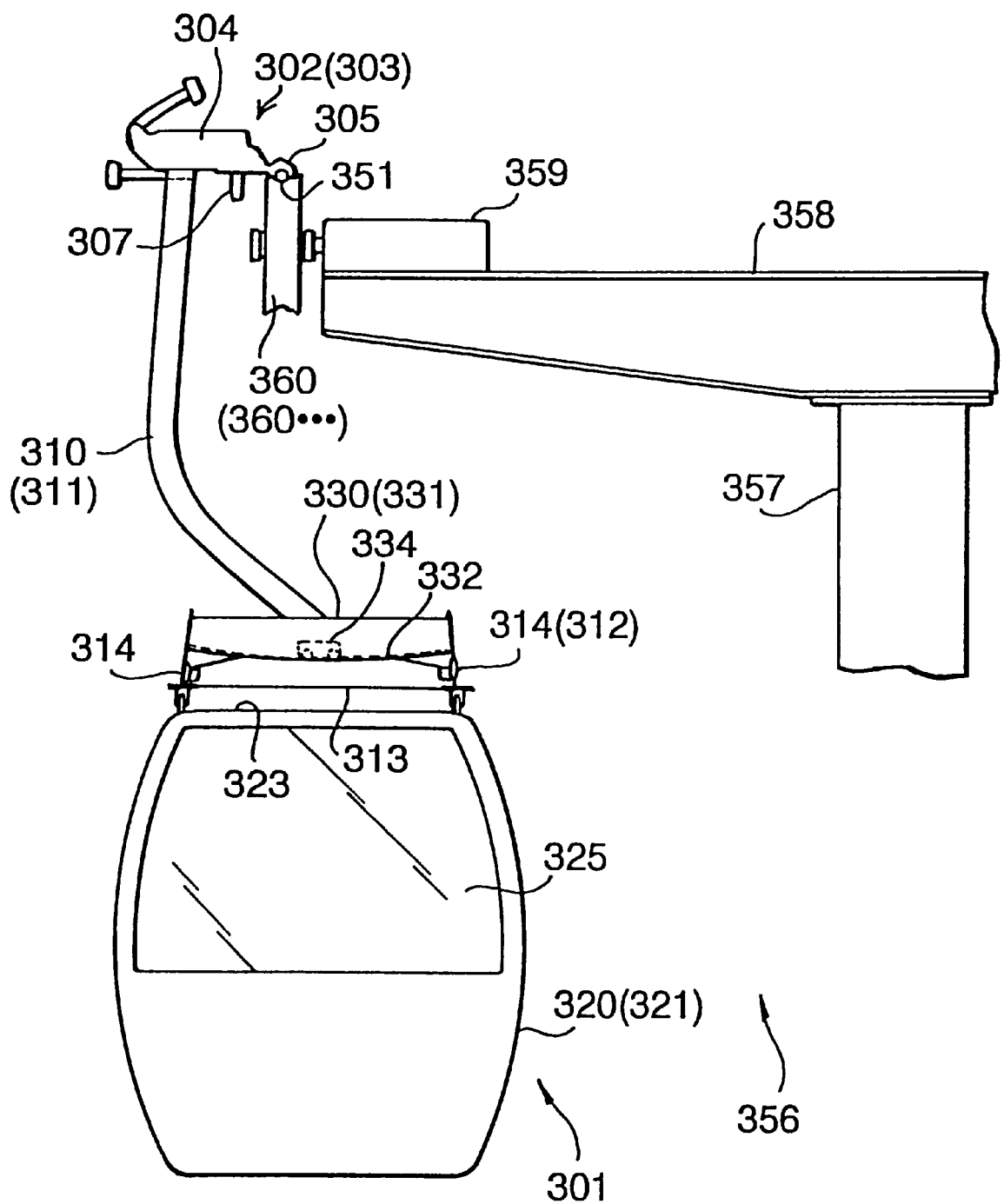
FIG. 18 is a schematic front view of the cable car passing in the vicinity of a tower and an arm for supporting the cable car in the middle of an endless track for the cable car.
Figure 19:
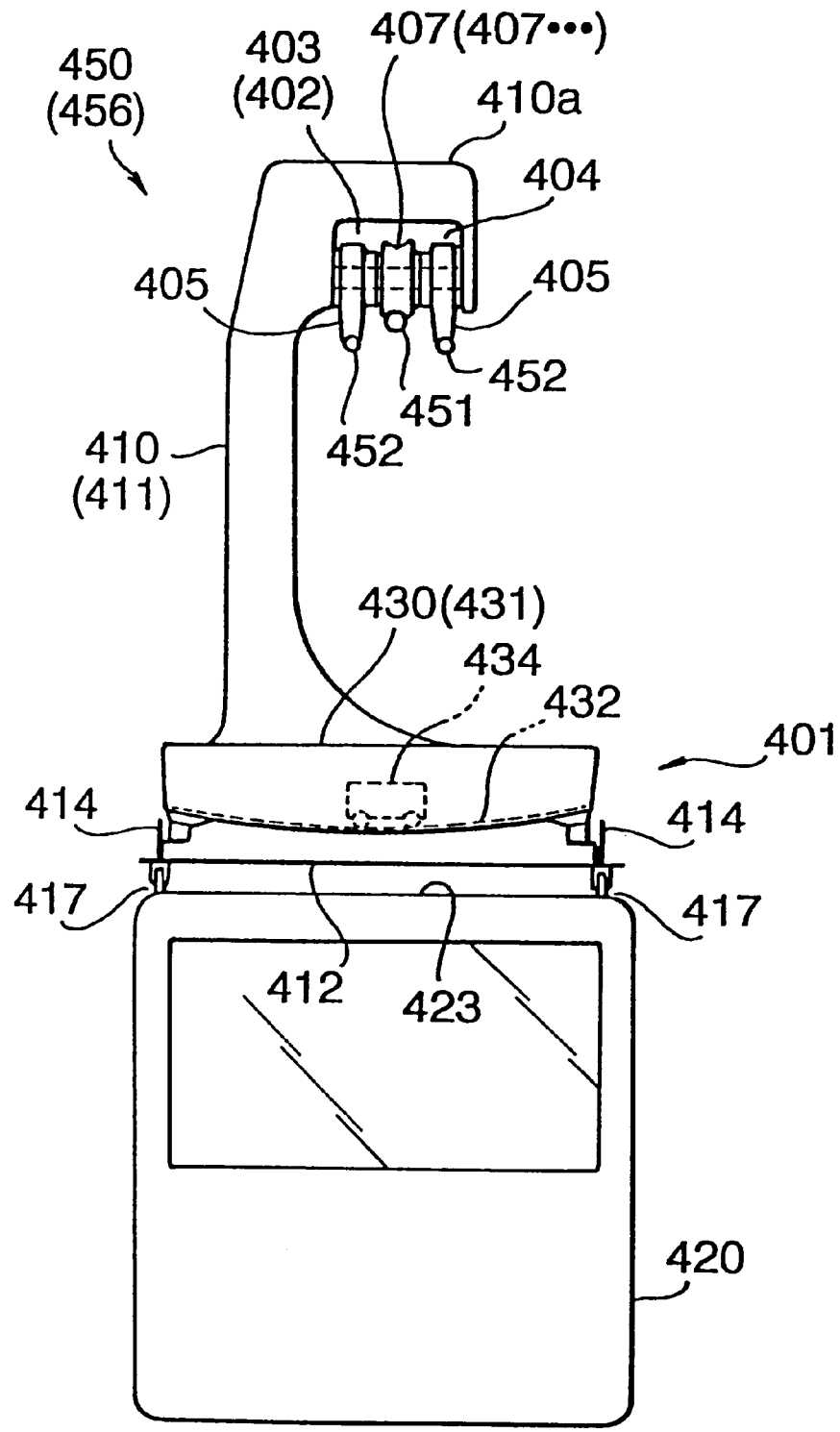
FIG. 19 is a schematic front view of a cable car of a type having two stationary cables and one U-shaped drive cable with two gondolas at free ends of the U-shaped drive cable (reversible aerial tramway type), which cable car being equipped with a vibration damping device according to a fourth embodiment of the present invention.
Figure 19A:
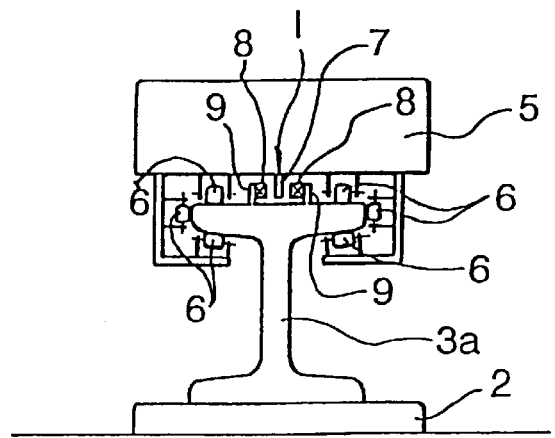
FIG. 19A illustrates a sectional view of another embodiment of the vibration damping device according to the present invention.

FIG. 19A depicts a still another modification of the embodiment shown in FIGS. 16A and 16B. A pair of guide rails 3 in FIG. 16B is replaced with a monorail 3a. A weight 5 having a plurality of wheels 6 rides on the monorail 3a and a magnetic damper I is provided on the bottom of the weight 5. The illustrated magnetic damper I is similar to the one shown in FIG. 17A (locations of the magnets and plate are reversed). It should be noted that the embodiment shown in FIG. 19A may be simplified like the one shown in FIG. 18A. Specifically, magnetic wheels 6 may be employed and the monorail 3a may serve as the plate 7. In FIGS. 16A, 16B and 19A, similar elements are assigned the same reference numerals. The monorail 3a makes the vibration damping apparatus compact.

Figure 20A:
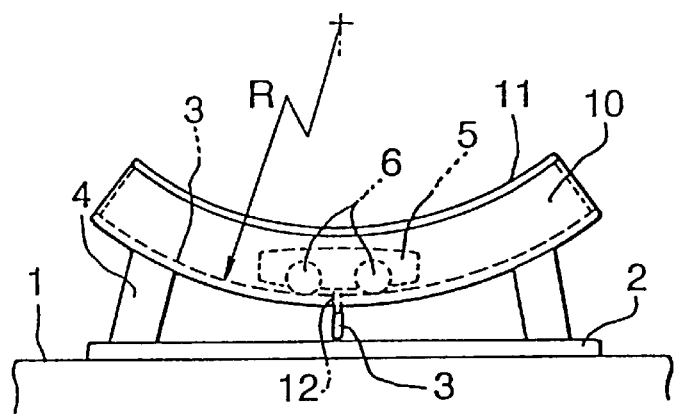
FIG. 20A depicts a front view of a vibration damping device according to another embodiment of the present invention.
Figure 20B:
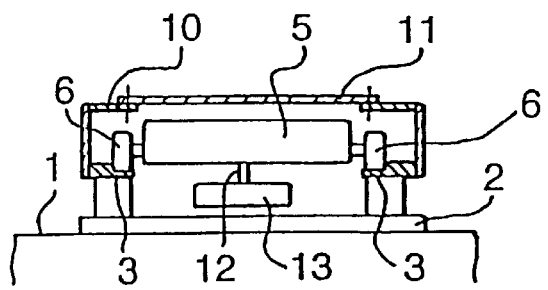
FIG. 20B is a transverse section of the vibration damping device shown in FIG. 20A.

FIGS. 20A and 20B illustrate yet another modification of the embodiment shown in FIGS. 16A and 16B. Instead of the magnetic damper I made from the magnets 8 and the plates 7, an air resistance plate 13 attached to a support element 12 hanging from the bottom of the damping weight 5 is provided. The air resistance plate 13 extends in a direction perpendicular to a direction in which the damping weight 5 moves. In short, an aerophysics damper is used in this embodiment. The air resistance plate 13 prevents the damping weight 5 from oscillating in an over-stroke. An air resistance exerted by the plate 13 is adjusted by changing the shape of the plate 13, increasing/decreasing the number of the plates 13 and/or making an opening in the plate 13. Accordingly, an appropriate damping force can be applied to the damping weight 5.

Figure 21A:
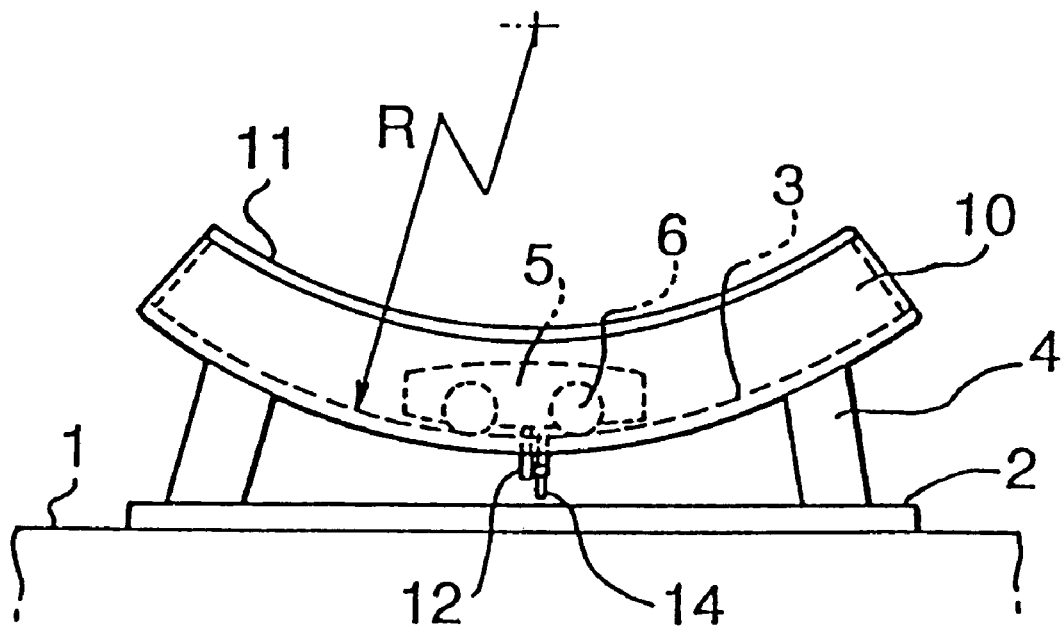
FIG. 21A depicts a front view of a vibration damping device according to another embodiment of the present invention.
Figure 21B:
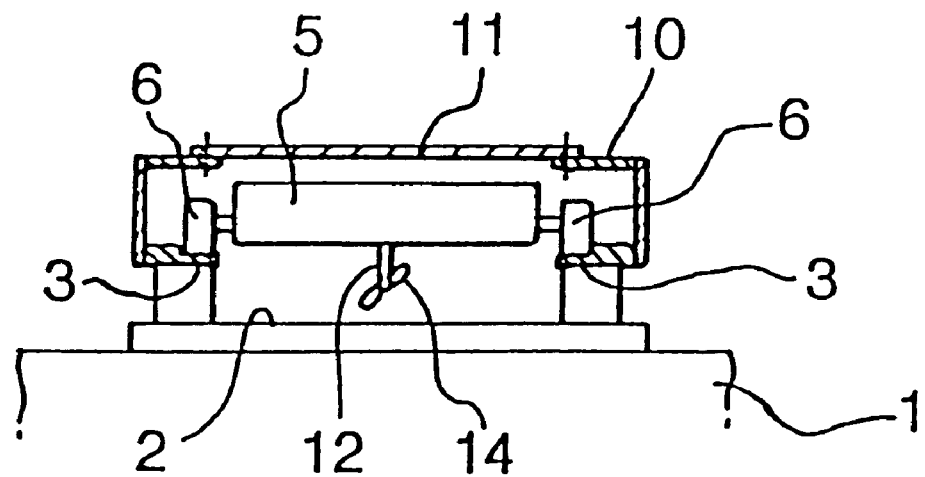
FIG. 21B is a transverse section of the vibration damping device shown in FIG. 21A.

FIGS. 21A and 21B illustrates a modification of the embodiment shown in FIGS. 20A and 20B. Instead of the air resistance plate 13, a propeller or fan 14 is attached to the supporting member 12. As the weight 5 moves, the propeller 14 generates a wind which prohibits the weight 50 from oscillating in an over-stroke. The number of the propellers 14 and/or the shape of the propeller 14 may be changed to control the damping force applied to the weight 5. The propeller 14 may be mounted on an arbitrary part of the weight 5 (e.g., on a top surface of the weight) as long as it does not affect a proper movement of the weight 5 on the rails 3. The propeller 14 may be a variable pitch propeller. In this case, the directions of blades of the propeller 14 are changeable so that the attenuating force is also changeable.

It should be noted that the monorail 3a shown in FIG. 19A may be employed in the embodiments shown in FIGS. 20A and 20B and FIGS. 21A and 21B.

Figure 23:
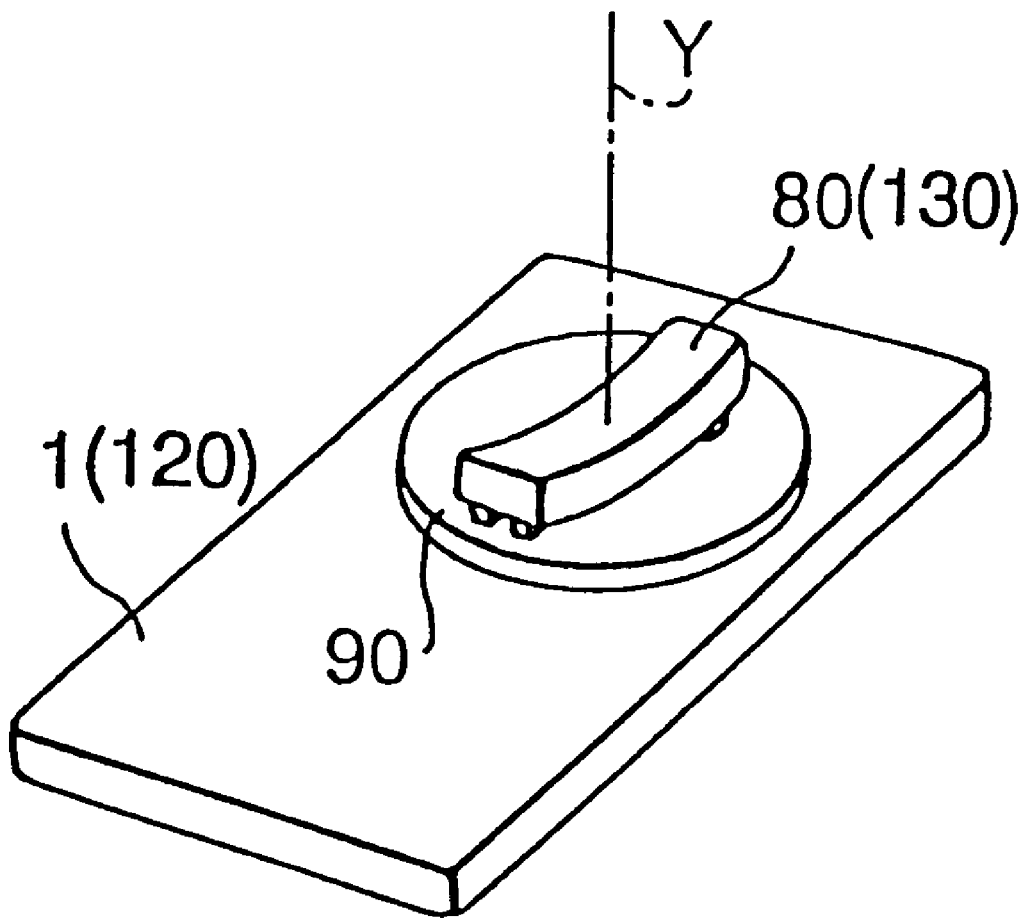
FIG. 23 shows a perspective view of a turntable to rotate the vibration damping device.

It should also be noted that the vibration attenuation device may be adapted to rotate about its vertical axis Y (FIG. 16A). Referring to FIG. 23, a turntable 90 is provided between the carriage floor 1 (127) and the base frame 2 of the vibration attenuation apparatus 80 (130). The damping apparatus 80 may be fixed on the turntable 90 and the turntable 90 may be rotatable relative to the floor of the carriage 1 (two apparatuses 80 (130) may be placed on a single turntable 90). The turntable 90 enables the damping apparatus 80 to cope with vibrations (winds) in any direction. The turning of the vibration damping apparatus 80 may be done by hands or a known drive mechanism (e.g., hydraulic drive unit). If the turntable 90 should be turned manually, a single opening may be formed in the turntable 90 and a plurality of mating openings may be formed in the floor 1. The openings in the floor 1 may be made in 0, 15, 30, 45, 60, 75 and 90 degree positions relative to the longitudinal direction of the carriage 1. A crew on the gondola inserts a pin into the opening of the turntable 90 and one of the mating openings of the floor 1 to fix the direction of the vibration damping apparatus 80. With the turntable 90, the vibration damping apparatus 80 can attenuate vibrations in any direction.

It should be noted that the vibration damping apparatus 80 may not be placed on the floor 1 via cushioning members such as ones 138 shown in FIG. 4 or a rubber plate.

It should be noted that the vibration attenuation apparatus of the present invention is applicable to any ropeway facility. It should also be noted that further changes and modifications may be made without departing from a spirit and scope of the present invention.

In the foregoing, the natural period of the vibration damping apparatus 130 (80) coincides with that of the gondola 101 (1). However, if the number of people on the gondola 101 should be considered, the natural period of the vibration damping apparatus 130 may be minus shifted by several % to several times ten % from the natural period of the gondola. The reason will be described with reference to FIGS. 5A to 5D. The graphs shown in FIGS. 5A to 5D illustrate relationship between a response magnification (amplitude ratio) "mu" of the gondola and a vibration period "T" of the gondola. The vertical axis indicates the response magnification and the horizontal axis indicates the vibration period. "To" represents a natural period of the gondola. The response magnification is a ratio of inclination (i.e., amplitude) of the gondola pushed by an external force (winds) having a certain period to inclination of the gondola pushed by the same external force having no period. FIG. 5A depicts the relationship between the response magnitude and the vibration period of the gondola when the gondola is not equipped with the vibration damping apparatus of the present invention. In other words, FIG. 5A shows the response magnification of the gondola when its number of degree of freedom in vibration is one. Thus, the curve of response magnification has only one peak. FIG. 5B illustrates the response magnification curve when the gondola is equipped with the vibration damping apparatus. If the vibration damping apparatus is loaded on the gondola, the number of degree of freedom of the total system becomes two according to a physical law. Therefore, the response magnification of the gondola has two peaks at "delta T"s as illustrated in FIG. 5B. Further, if the natural period of the gondola and that of the vibration damping apparatus are the same, the response magnification of the gondola draws the curve as depicted in FIG. 5C. Specifically, if the gondola is provided with the vibration damping apparatus and the vibration damping apparatus is actuated with the same natural period as the gondola, then the response magnification of the gondola has a sufficiently low area around To as indicated by oblique lines. The response magnification has a least value at To. This means that the vibration of the gondola is suppressed enough in the oblique area and the vibration damping apparatus effectively functions in this range. At ±delta T from To (or at two peaks of the curve), the response magnification has two maximum values and the vibration damping apparatus cannot demonstrate a satisfactory damping effect. If the natural period of the vibration damping apparatus is minus shifted, the response magnification curve changes its shape as illustrated in FIG. 5D. Specifically, the left peak of the curve shown in FIG. 5C is flattened and the oblique area (i.e., effective range of the vibration damping apparatus) is widened as compared with FIG. 5C. Accordingly, shifting the natural period of the vibration damping apparatus to the minus side results in broadening the effective range of the vibration damping apparatus. As understood from FIG. 5D, the effective area ranges from a point "a" to a point "b" on the horizontal axis of the graph. FIG. 5D illustrates the curve when people are getting off the gondola 101. As the people alight from the gondola 101, the natural period of the gondola is minus shifted and the response magnification of the gondola changes from the one shown in FIG. 5C to the one shown in FIG. 5D. The response magnification varies between the points "a" and "b" depending upon the number of passengers on board. Therefore, even if the number of persons on the gondola changes, the effective range of the vibration damping apparatus never becomes smaller than that shown in FIG. 5C. Accordingly, it is preferred to beforehand minus shift the natural period of the vibration damping apparatus from that of the gondola by several % to several times ten %. Particularly, if vibrations at the time of no passenger should be attenuated, the natural period is preferably minus shifted.

Figure 3:
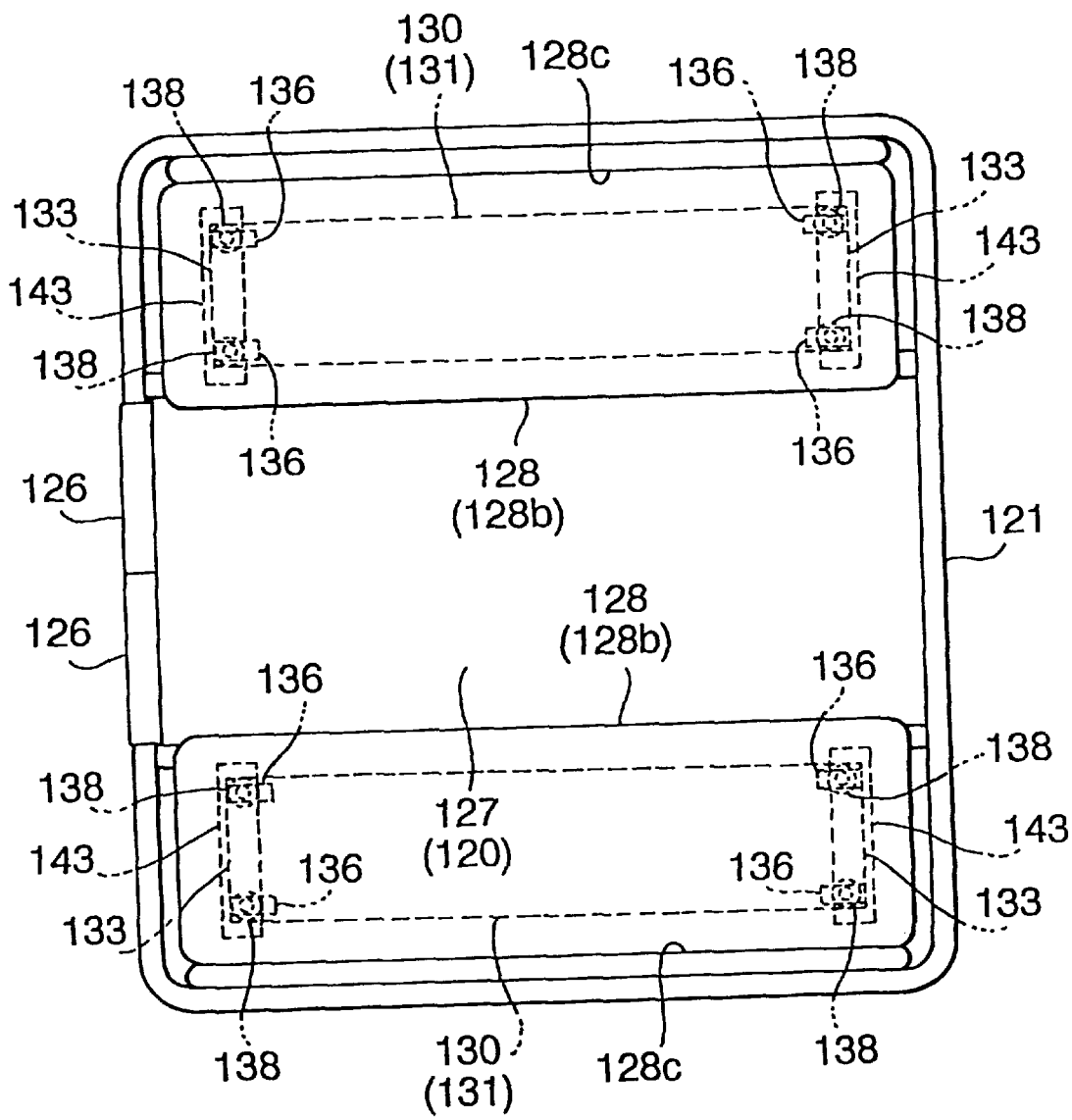
FIG. 3 is a horizontal sectional view of the cable car shown in FIG. 1 illustrating a positional relation between the vibration damping apparatus and a passenger seat.

Referring now to FIGS. 2 to 4, installation of the vibration damping device 130 will be described.

Each vibration damping device 130 has a dimension which can be placed under the seat 128.

One vibration damping device 130 is placed in a space 129 below the front seat 128 and the other vibration damping device 130 is placed in another space 129 below the rear seat 128 as illustrated in FIGS. 2 and 3. Each vibration damping device 130 extends in a longitudinal direction of the associated seat 128 or a direction perpendicular to the cable 151. Vibrations in this direction are those which should be attenuated by the vibration damping devices 130. The vibration damping devices 130 are provided in the same manner so that installations of one vibration damping device 130 will be described below.

As depicted in FIG. 4, a pair of U-shaped supporting members 143 is provided on the floor 127 below the seat 128 inside the carriage 120. The open sides of "U" of the supporting members 143 face each other on the floor 127. The supporting members 143 extend in parallel in the length direction of the carriage 120 (i.e., a direction perpendicular to the drawing sheet of FIG. 4). Two bores 144 are formed in an upper edge 143a of each supporting member 143. The casing 131 of the vibration damping device 130 has pedestals 136 at its longitudinal ends 133. The pedestals 136 extend downwardly. Each heel 136a of the pedestal 136 has one bore 137. A cushioning member 138 is provided between the upper edge 143a of the supporting member 143 and the heel 136a of the pedestal 136 of the damping weight casing 131. The cushioning member 138 is a resilient member such as a vibration proof rubber having bolts 139 and 140 at its top and bottom. The bolts 139 and 140 may be insertmolded or attached by an adhesive. The upper bolt 139 extends through the bore 137 of the pedestal 136 and the upper end of the cushioning element 138 is fixed onto the pedestal 136 by a nut 141. The lower bolt 140 extends through the bore 144 of the supporting member 143 and the lower end of the cushioning element 138 is fixed onto the supporting member 143 by another nut 142. In this manner, each vibration damping device 130 is supported at four points via the cushioning members 138 (FIG. 3).

It should be noted that the number of the vibration damping devices 130 in each installation space 129 may be more than one. Also, only one vibration damping device 130 may be provided under one of the seats 128 and a counter balance may be provided under the other seat 128. If there is a third seat between the front and rear seats, the vibration damping device may be located under the third seat only or under all of these seats. In addition, the longitudinal direction of the vibration damping device 130 or the direction in which the damping weight 134 oscillates may be changed depending upon an actual vibration direction of the gondola 101. Specifically, the damping weight oscillation direction may be oblique to the cable 151 as viewed from the top of the gondola 101. In the foregoing, it is assumed that the gondola 101 oscillates in the width direction of the gondola 101. However, the gondola 101 may oscillate in a slightly different direction under various conditions. Turning the vibration damping device 130 may be necessary to coincide the oscillation direction of the vibration damping weight with the actual oscillation direction of the gondola.

Now, operations of the gondola facility 101 will be described with reference to FIG. 5.

Figure 5:
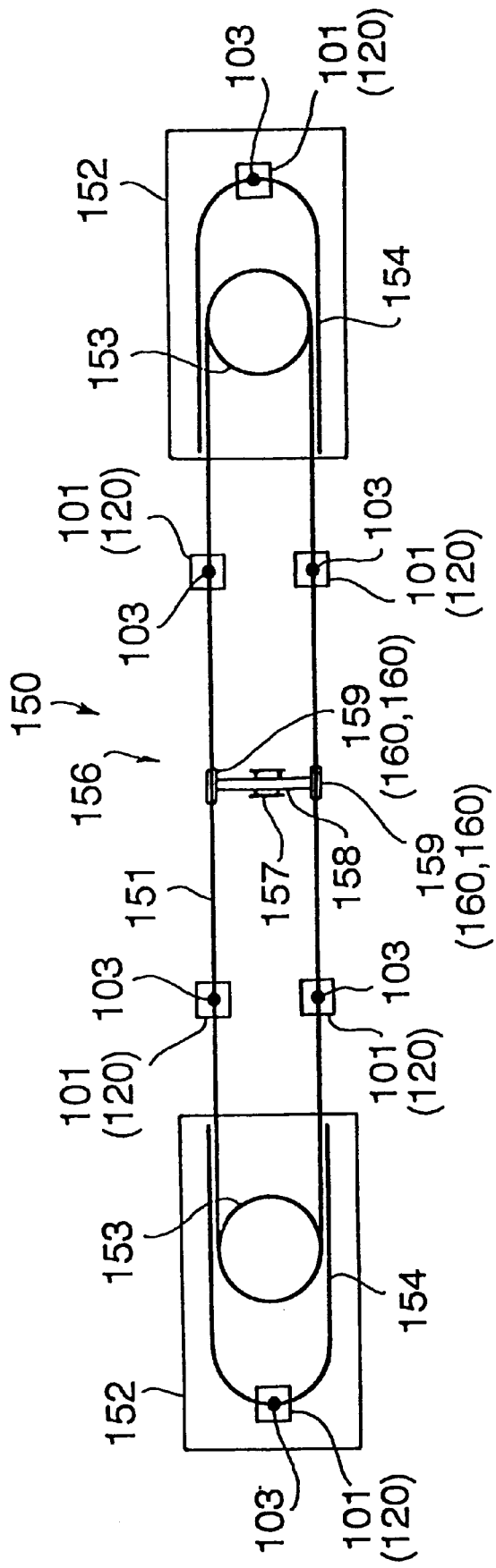
FIG. 5 is a schematic plan view of a gondola facility showing movement of a cable car of a single-cable automatically-circulating type.
Figure 5A:
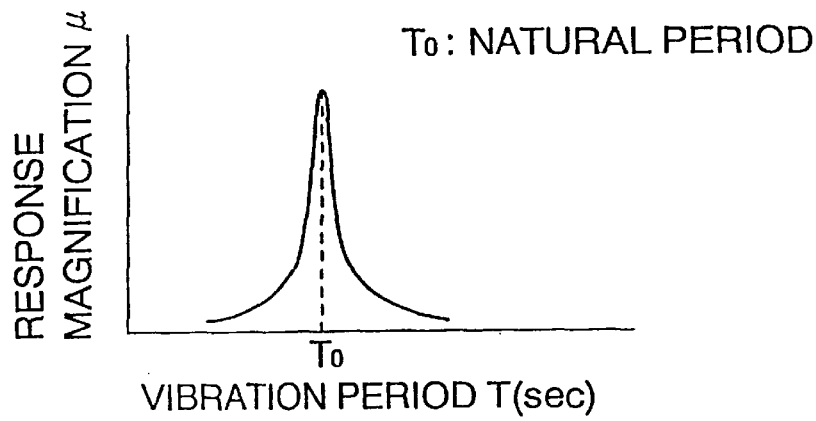
FIG. 5A is a graph showing a relationship between a response magnification (vibration amplitude ratio) and a vibration period of the cable car without the vibration damping apparatus.
Figure 5B:
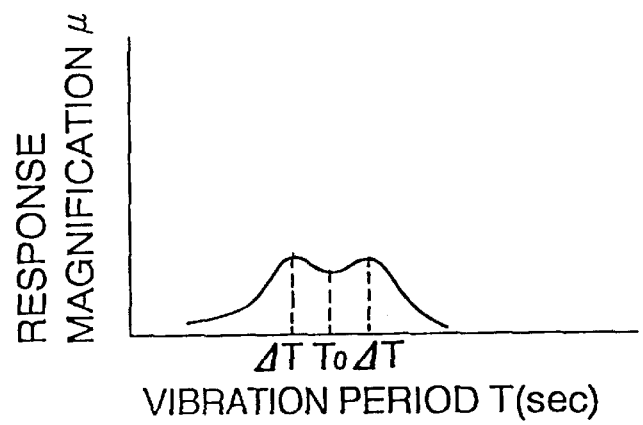
FIG. 5B is a graph showing a relationship between the response magnification and the vibration period of the cable car with the vibration damping apparatus.
Figure 5C:
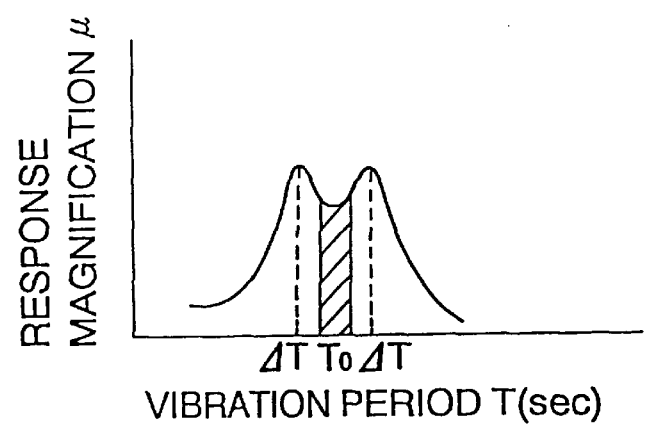
FIG. 5C is a graph showing a relation between the response magnification and the vibration period of the cable car with the vibration damping apparatus when a natural period of the vibration damping apparatus and that of the cable car are set to be the same and the vibration damping apparatus is activated.
Figure 5D:
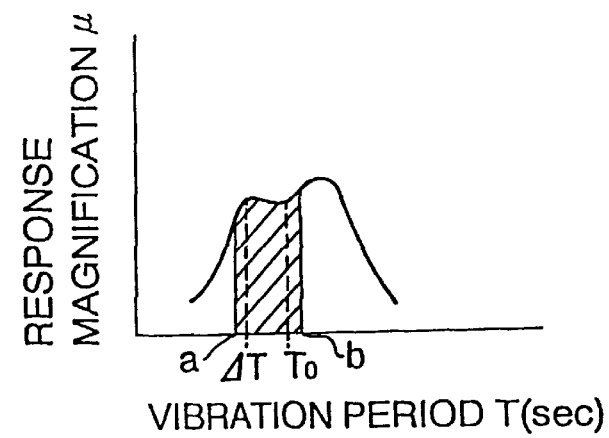
FIG. 5D is a graph showing a relationship between the response magnification and the vibration period of the cable car when the natural period of the vibration damping apparatus is minus shifted from the natural period of the cable car.

FIG. 5 illustrates a schematic top view of a single-cable automatically circulating gondola facility 150. Its supporting means 102 is the cable gripping unit 103. Boarding or stopping stations 152 are provided at opposite positions of an elongated endless track 156 and pulleys 153 are provided at the upper and lower stations respectively. The endless cable 151 is engaged over these pulleys 153 with an appropriate tension. The cable 151 circulates in the endless track 156. The cable 151 is also supported and guided by cable holding up/down devices 159 mounted on an arm 158 of a supporting tower 156 at the middle of the conveyance track 156. At the boarding stations 152, the gondola 101 moves on a boarding or slowdown rail 154 using the traveling roller 107 of the cable gripping unit 103 (FIG. 1). When the gondola 101 leaves the station (e.g., the lower station) 152, the cable gripping unit 103 firmly grips the general cable 151 which is moved at a normal speed. The cable 151 is circularly driven so that the gondola 101 is conveyed toward the opposite station (e.g., the upper station) 152. When the gondola 101 reaches the opposite station 152, the gripping unit 103 releases the conveyance cable 151 and rides on the boarding/slowdown rail 154. In this manner, a number of gondolas 101 are conveyed in the endless track 156.

While the gondola 101 is traveling along the conveyance track 156 and through the boarding stations 152, the cable gripper 103 and the hanger 110 of the gondola 101 approach machines and structures which are necessary to drive the gondola 101. Therefore, a device attached to the gondola 101 should not intervene with these machines and structures. In the present invention, the vibration damping devices 130 are placed under the seats 128 inside the passenger car 120 and they do not project outward from the gondola 101. Thus, the vibration damping devices 130 do not become obstructions to the surrounding facilities.

The gondola 101 rolls having the center of rolling on the cable 151 or the supporting device 103 like a pendulum upon a wind (external force). The center of gravity of the gondola 101 generally coincides with the center of the passenger car 120 although it varies with the number of the people on board. The gondola 101 therefore performs an oscillation having a natural period determined by the distance from the center of gravity to the rolling center. Generally the vibration damping device 130 should not be placed at the center of gravity of the gondola 101 to insure an appropriate damping effect. The location of the vibration damping devices 130 in this embodiment is the under the seat so that it is deviated downward from the center of gravity of the gondola 101. Therefore, the illustrated vibration damping devices 130 are able to demonstrate a sufficient damping effect. By changing the radius of curvature R of the arcuate rail plate 132 of the vibration damping device 130, it is possible to arbitrarily determine the natural period of the vibration damping device. Thus, an appropriate attenuation effect can be realized.

It should be noted that the present invention is not limited to the above embodiment. The illustrated embodiment is directed to an automatically circulating gondola having an automatic cable gripper which grips and releases the cable. However, the vibration damping device of the present invention is applicable to any type of ropeway facility. For example, it is applicable to a gondola facility having two parallel automatically circulating cables, a gondola facility having a single endless cable with a plurality of carriages being fixed on the cable with predetermined clearances (fixed grip type), a gondola facility having a U-shaped drive cable and two stationary guide cables with two carriages being fixed at ends of the drive cable and the drive cable being hooked over a drive pulley at the upper station (reversible aerial tramway type). Also, the supporting unit is not limited to the cable gripping device. For instance, it may be a rolling unit which rolls on the stationary cable.

Second Embodiment

A second embodiment of the present invention will be described with reference to FIGS. 6 to 10. This embodiment also deals with a single-cable automatically-circulating gondola 201 which uses a cable gripping unit 203 as a supporting device 202.

Figure 6:
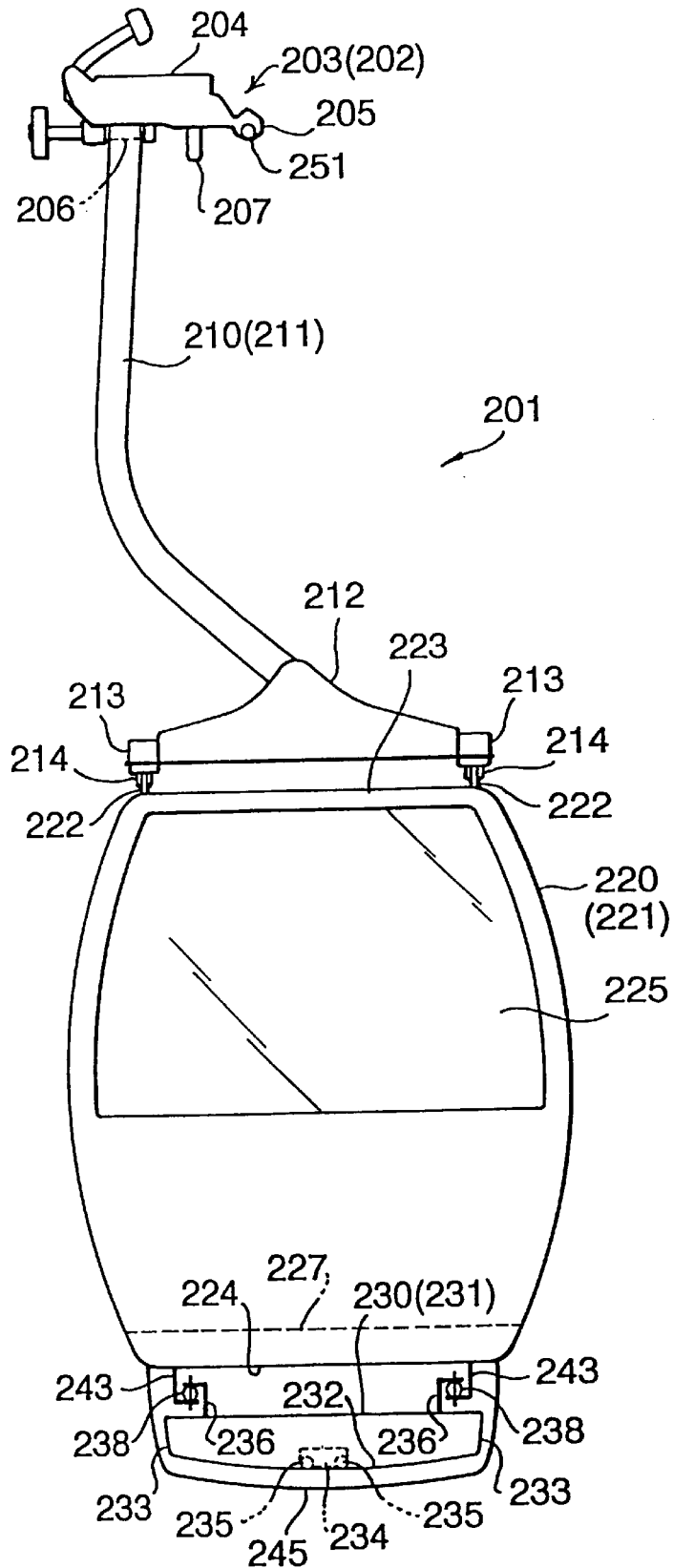
FIG. 6 illustrates a front view of a cable car equipped with a vibration damping device according to the second embodiment of the present invention.

Referring to FIG. 6, the gondola 201 includes the cable gripping device 203 (i.e., the supporting means 202) for holding a cable 251, a hanger 210 suspended from the cable griping device 203, a passenger car 220 suspended from the hanger 210, a pair of parallel vibration damping devices 230 attached to an outer surface of a bottom 224 of the passenger car 220 (FIG. 7) and a bottom cover 245 attached to the passenger car bottom 224 to house and hide the vibration damping devices 230. The cable gripping device 203 generally extends in a horizontal direction from the cable 251 and has a gripping portion 205 at an end of its main body 204. The gripping portion 205 grasps the cable 251 resiliently by a spring (not shown). This type of grip is known as a spring-type. The main body 204 of the griping device 203 extends from the cable 251 in a generally horizontal direction. At a lower surface of the gripping device main body 204, fixed is a pin 206 to pivotably support an upper end of the hanger 210. The pivotable connection at the pin 206 enables both the hanger 210 and the passenger car 220 supported by the hanger 210 to always take a vertically suspended posture. A roller 207 is also provided on the lower surface of the grip device main body.

The hanger 210 is suspended from the grip device 203. The hanger 210 has a gently bent and downwardly extending main portion 211 and a lower frame 212 extending generally horizontally. A lower end of the main portion 211 is joined with an approximate center of the lower frame 212. An upper end of the main body 211 is supported by the gripping device 203. The lower frame 212 is elongated in a width direction of the passenger car 220. The main portion 211 may be made from a tubular member having a square or rectangular cross section. Cylindrical members 213 are fixed at ends of the lower frame 212. A rod 214 downwardly extends from each cylindrical member 213, and a connection member 222 of the passenger car 220 is engaged with each rod 214. The connection members 222 are provided on a roof 223 of the passenger car 220. The passenger car 220 is suspended from the hanger 210 at the connection members 222.

Figure 7:
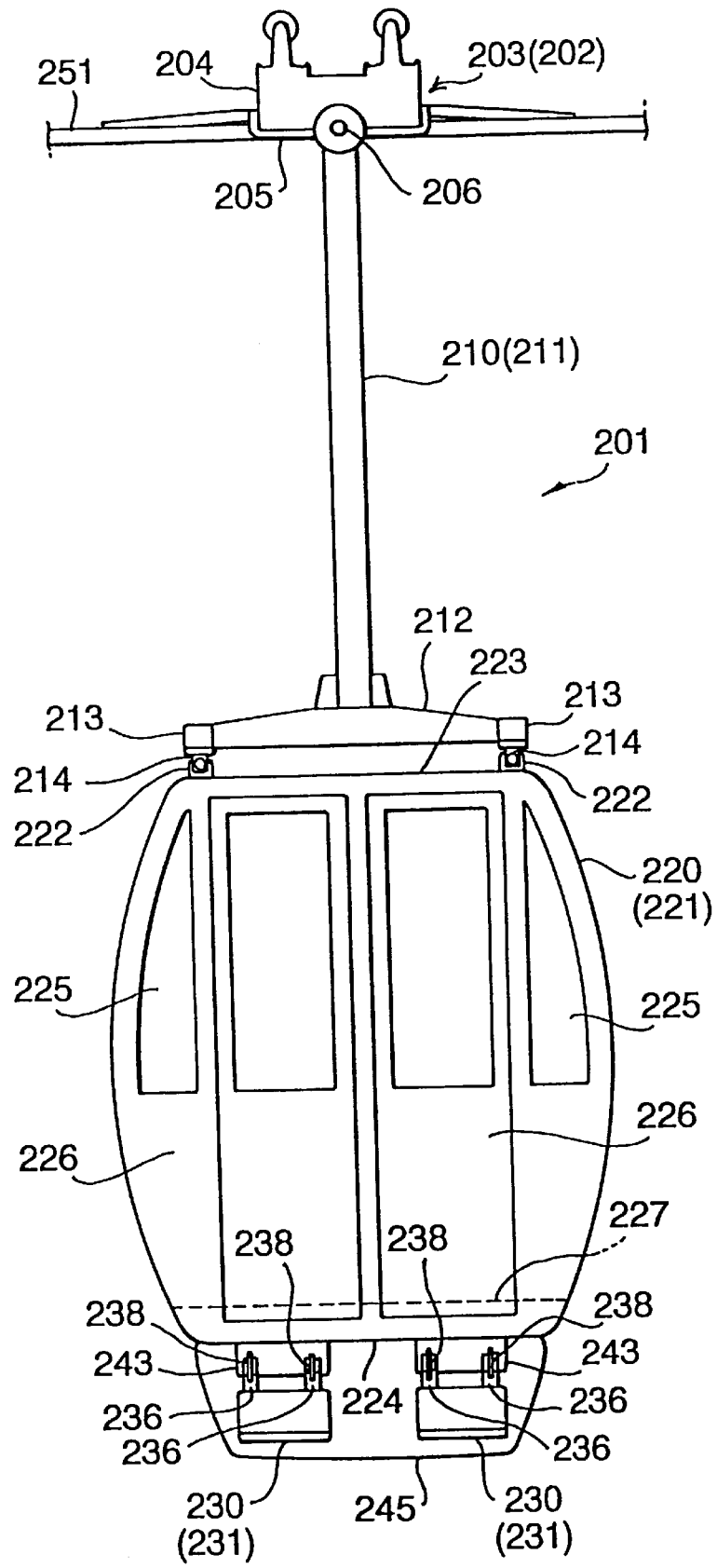
FIG. 7 is a lateral view of the cable car shown in FIG. 6.

The hanger 210 extends straight if viewed from its lateral side (FIG. 7).

The passenger car 220 has a body structure 221 which includes front and rear walls as well as right and left walls of the passenger car. The passenger car 220 also has the roof 223 and the bottom wall 224. The passenger car 220 is a closed carriage. Like ordinary ones, the passenger car 220 has windows 225 for view watching and doors 226 for boarding (FIG. 7). Inside the carriage 220, a floor plate 227 is provided which passengers step on. Opposed front and rear seats (not shown) are provided on the floor 227 in the passenger car 220.

Figure 9:
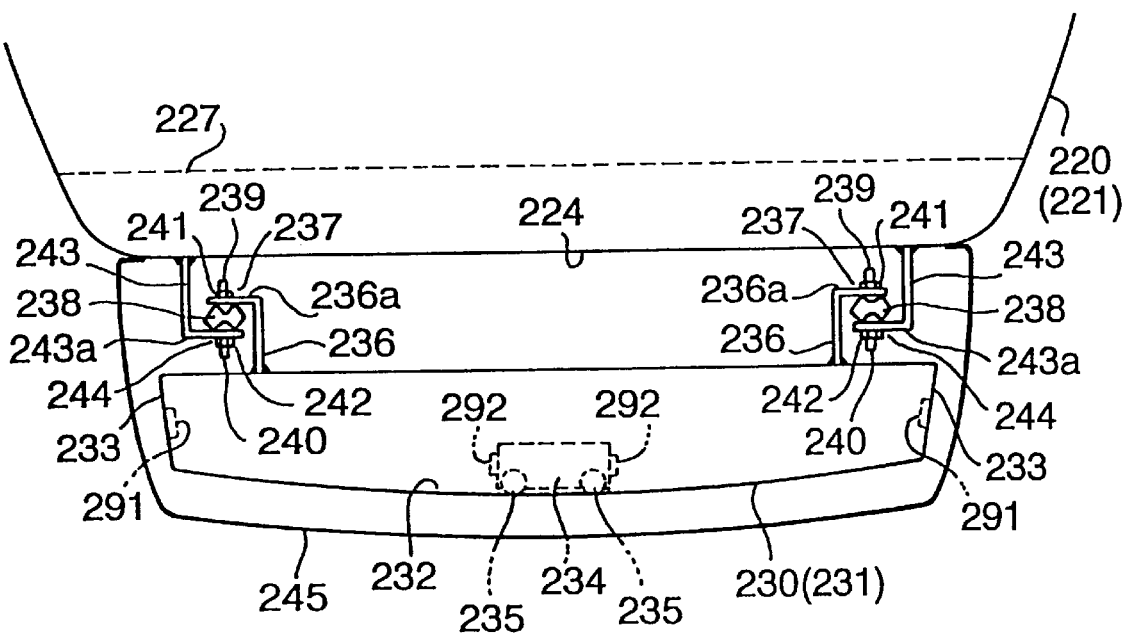
FIG. 9 is an enlarged front sectional view of the cable car illustrating a detail positional relationship between the vibration damping apparatus and the bottom of the passenger car.

The vibration damping device 230 of this embodiment is the same as that of the first embodiment. Therefore, its details are not described here. In FIG. 9, reference numeral 231 designates a vibration damping device casing, 232 a guide rail plate, 234 a damping weight, 235 wheels of the damping weight, 291 magnets attached to end plates of the casing 231 and 292 magnets attached to end faces of the damping weight 234.

Figure 8:
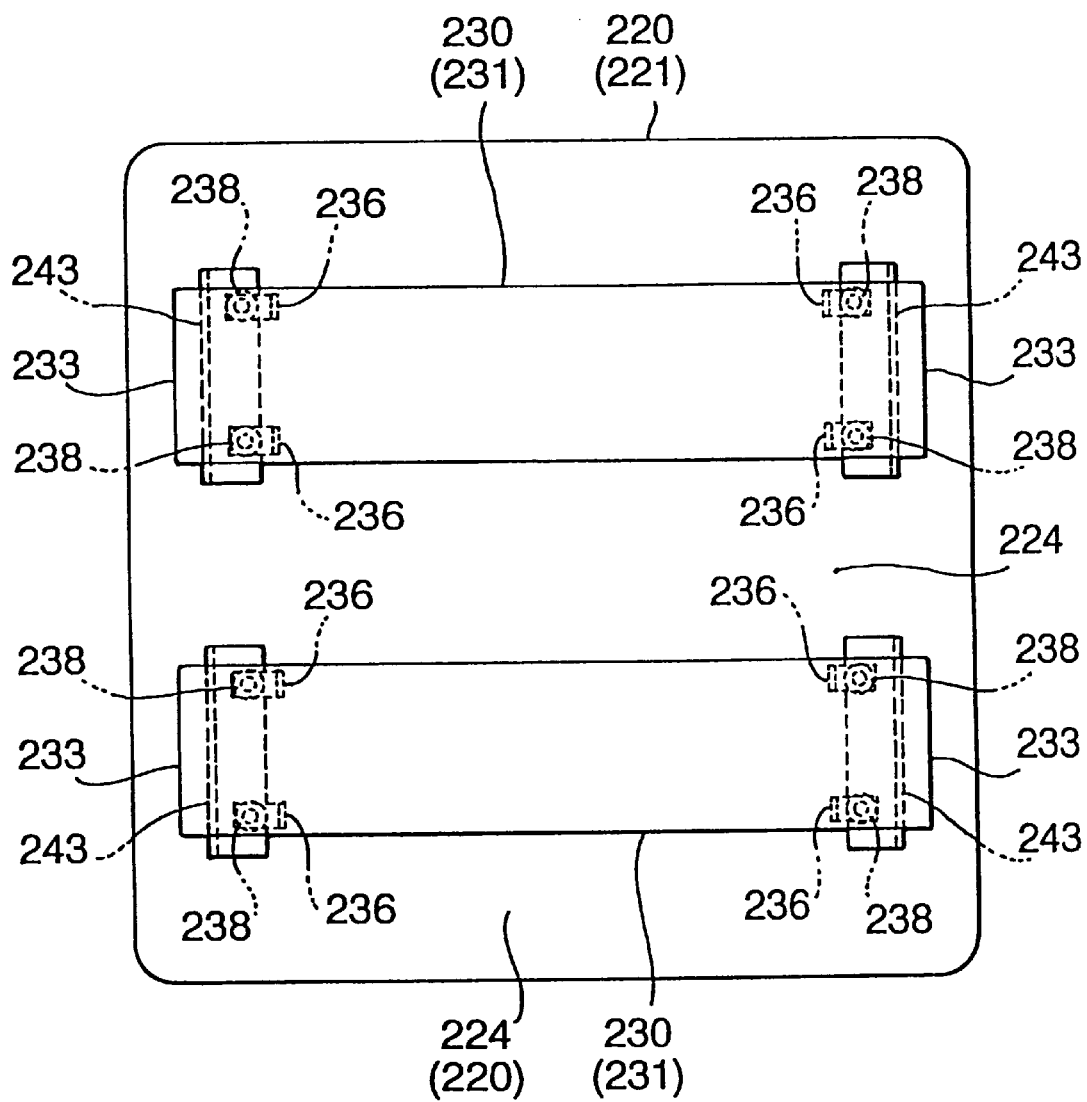
FIG. 8 is a bottom view of the cable car showing a positional relationship between the vibration damping apparatus and a bottom of the passenger car (a cover for the vibration damping apparatuses is omitted)

Referring now to FIGS. 8 and 9, installation of the vibration damping device 230 will be described.

FIG. 8 illustrates the bottom 224 of the carriage 220 of the gondola 201 and the vibration damping devices 230 mounted thereon. The cover 245 for enclosing the vibration damping devices 230 is omitted for the sake of clarity in this illustration. The vibration damping devices 230 do not extend outward from the bottom 224 of the gondola 220 in right and left directions as well as in front and rear directions of the gondola 220 as viewed from the bottom as best seen in FIG. 8.

Front and rear vibration damping devices 230 are suspended from the bottom 224 of the carriage 220. The two vibration damping devices 230 extend in parallel in the width direction of the gondola 201. Vibrations in the width direction of the gondola 201 are vibrations which should be mostly attenuated by the vibration damping devices 230. The vibration damping devices 230 are provided in the same manner so that installations of one vibration damping device 230 will be described below.

As depicted in FIG. 9, a pair of L-shaped supporting members 243 downwardly extends from the bottom 224 of the carriage 220. The top or tip of "L" of each supporting member 243 is fixed near a right or left edge of the gondola 201, the vertical side of "L" extends generally vertically and the bottom side 243a of "L" extends generally horizontally. Two openings 244 are formed in the horizontally extending portion 243a. Two suspension members 236 project upwardly from the top of the casing 231 of the vibration damping device 230 near each longitudinal end 233 of the casing 231 (FIG. 8). The suspension member 236 is an upside-down "L"-shaped one and its horizontal side 236a faces the horizontal side 243a of the associated supporting member 243 in a height direction of the gondola 201. One opening 237 is formed in the horizontal side 236a of each suspension member 236. The horizontal side 243a is positioned below the horizontal side 236a. Between these horizontal sides, provided is a cushioning member 238. In short, the vibration damping devices 230 are suspended from the carriage bottom 224 via the cushioning members 238.

The cushioning member 238 is a resilient member such as a vibration proof rubber and has upper and lower bolts 239 and 240. The bolts may be insert-molded while the cushioning member 238 is manufactured or may be attached later by an adhesive. The upper bolt 239 extends through the opening 237 formed in the horizontal section 236a of the suspension member 236 and the top of the cushioning member 238 is fixed to the horizontal section 236a by a nut 241. The lower bolt 240 extends through the opening 244 formed in the horizontal section 243a of the supporting member 243 and the bottom of the cushioning member 238 is fixed to the horizontal section 243a by another nut 242. Therefore, each vibration damping 230 is mounted on the bottom 224 of the carriage 220 at four locations via the four resilient members 238 as best seen in FIG. 8.

The cover 245 completely houses the vibration damping devices 230 so that appearance of the gondola 201 is not affected by the vibration damping devices 230. The cover 245 has a configuration in conformity with the configuration of the carriage 220. The contour of the carriage 220 is substantially continuous to the cover 245 as shown in FIG. 7.

It should be noted that the number of the vibration damping devices 230 may be more or less than two. If an odd number of vibration damping devices are provided, a counter weight may be mounted to keep the moment balance. In addition, the longitudinal direction of the vibration damping device 230 (i.e., the direction in which the damping weight 234 oscillates) may not perpendicular to the cable 251. The oscillation direction of the damping weight 234 may be slant to the cable 251 as viewed from the top of the gondola 201. A turntable means for changing the oscillation direction of the damping weight 234 may be provided such as one as shown in FIG. 23.

Now, operations of the gondola facility 201 will be described with reference to FIG. 10.

Figure 10:
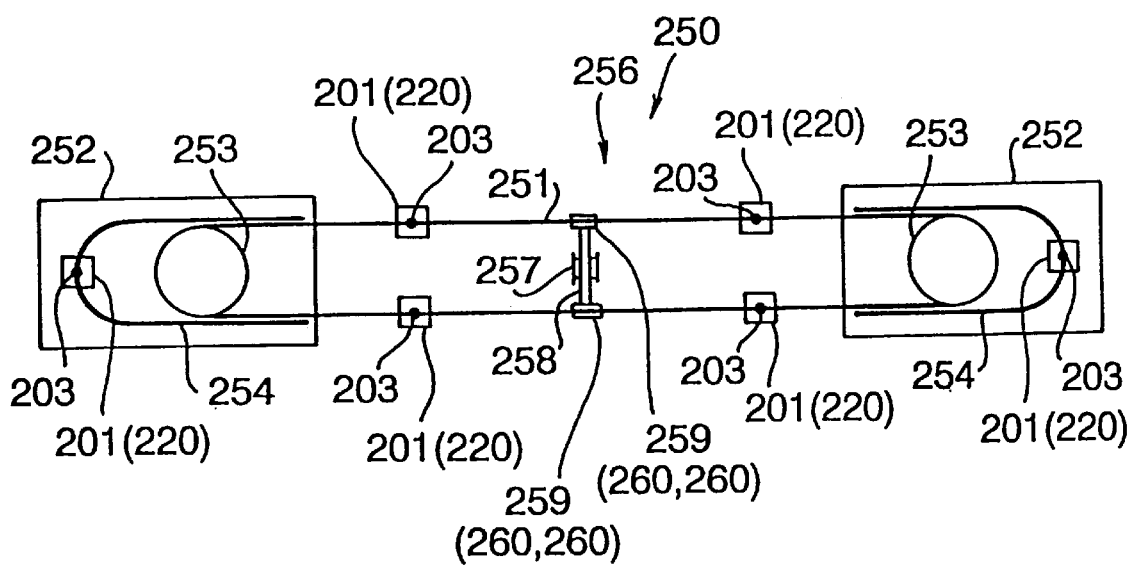
FIG. 10 depicts a schematic plan view of an overall gondola facility showing movements of the cable car of a single-cable automatically-circulating type.

FIG. 10 illustrates a schematic top view of a single-cable automatically circulating gondola facility 250. Its supporting means 202 is the cable gripping unit 203. Boarding or stopping stations 252 are provided at opposite positions of an elongated endless track 256 and pulleys 253 are provided at the upper and lower stations respectively. The endless cable 251 is engaged over these pulleys 253 with an appropriate tension. The cable 251 circulates in the endless track 256. The cable 251 is also supported and guided by cable holding up and down devices 259 mounted on an arm 258 of a supporting tower 256 at the middle of the conveyance track 256. At the boarding stations 252, the gondola 201 moves on a boarding or slowdown rail 254 using the traveling roller 207 of the cable gripping unit 203 (FIG. 6).

When the gondola 201 leaves the boarding station (e.g., the lower station) 252, the cable gripping unit 203 firmly grips the general cable 251 which is moved at a normal speed. The cable 251 is circularly driven so that the gondola 201 is conveyed toward the opposite station (e.g., the upper station) 252. When the gondola 201 reaches the opposite station 252, the gripping unit 203 releases the conveyance cable 251 and rides on the slowdown rail 254 again. In this manner, a number of gondolas 201 are conveyed in the endless track 256.

While the gondola 201 is traveling along the conveyance track 256 and through the boarding stations 252, the cable gripper 203 and the hanger 210 of the gondola 201 approach machines and structures which are necessary for operations of the gondola 201. Therefore, a device attached to the gondola 201 should not intervene with these machines and structures. In the present invention, the vibration damping devices 230 are placed under the passenger car 220 and they have dimensions which do not project outward from the gondola 201 in right and left directions as well as in front and rear directions. Also, the height of the vibration damping device 230 (or the cover 245) is relatively small. Thus, the vibration damping devices 230 do not become obstructions to the surrounding facilities.

The gondola 201 rolls having the center of rolling on the cable 251 or the supporting device 203 like a pendulum upon a wind (external force). The center of gravity of the gondola 201 generally coincides with the center of the passenger car 220 although it varies with the number of the people on board. The gondola 201 therefore performs an oscillation having a natural period determined by the distance from the center of gravity to the rolling center. Generally the vibration damping device 230 should not be placed at the center of gravity of the gondola 201 to achieve a sufficient damping effect. The location of the vibration damping devices 230 in this embodiment is the under the bottom of the carriage 220 so that it is deviated downward from the center of gravity of the gondola 201. Therefore, the illustrated vibration damping devices 230 are able to demonstrate a sufficient damping effect. By changing the radius of curvature of the arcuate rail plate of the vibration damping device 230, it is possible to arbitrarily determine the natural period of the vibration damping device. Thus, an appropriate attenuation effect can be realized.

It should be noted that the present invention is not limited to the above embodiment. The present invention is applicable to any type of ropeway facility.

Third Embodiment

A third embodiment of the present invention will be described with reference to FIGS. 11 to 15. This embodiment also deals with a single-cable automatically-circulating gondola 301 which uses a cable gripping unit 303 as a supporting device 302.

Figure 11:
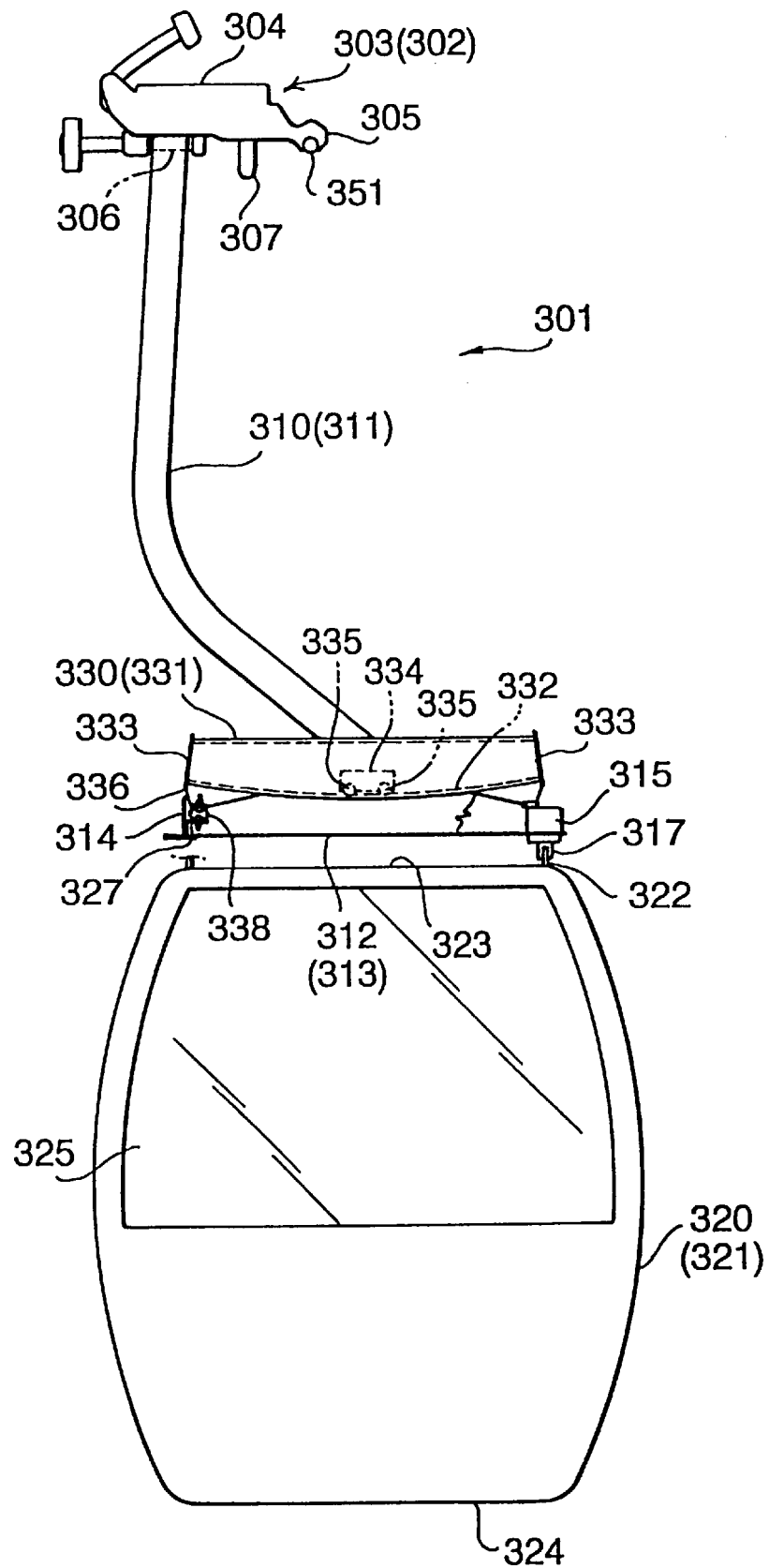
FIG. 11 shows a cable car equipped with a vibration damping apparatus according to another embodiment of the present invention (third embodiment)
Figure 12:
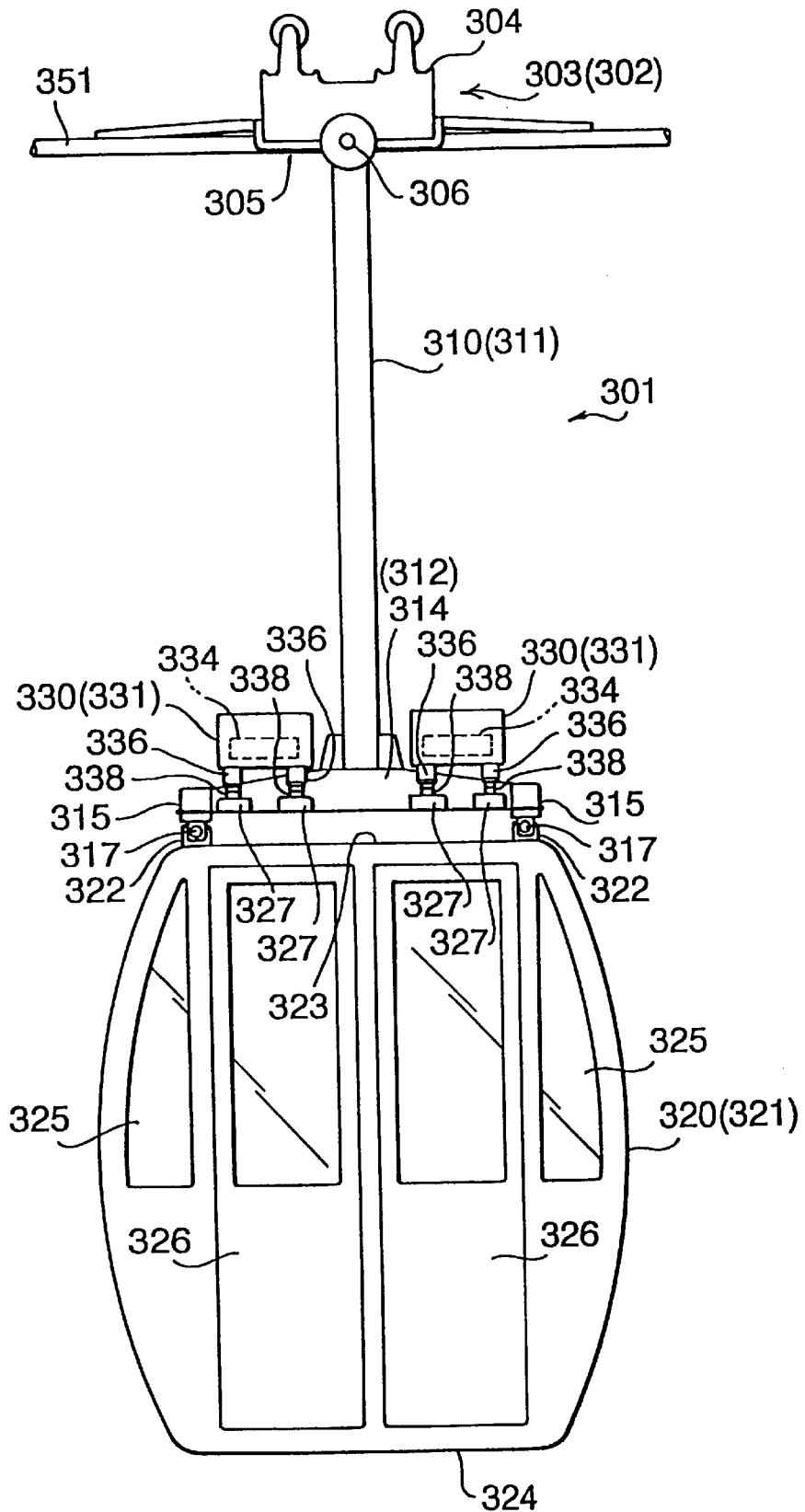
FIG. 12 is a lateral view of the cable car shown in FIG. 11.

Referring to FIG. 11, the gondola 301 includes the cable gripping device 303 (i.e., the supporting means 302) for holding a cable 351, a hanger 310 suspended from the cable griping device 303, a passenger car 320 suspended from the hanger 310 and a pair of parallel vibration damping devices 330 mounted on a lower frame 312 of the hanger 310 above a top 323 of the passenger car 320 (FIG. 12). The cable gripping device 303 generally extends in a horizontal direction from the cable 351 and has a gripping portion 305 at an end of its main body 304. The gripping portion 305 grasps a cable 351 resiliently by a spring (not shown). This type of grip is known as a springtype. The main body 304 of the griping device 303 extends from the cable 351 in a generally horizontal direction. At a lower surface of the gripping device main body 304, fixed is a pin 306 to pivotably support an upper end of the hanger 310. The pivotable connection at the pin 306 enables both the hanger 310 and the passenger car 320 supported by the hanger 310 to always take a vertically suspended posture. A roller 307 is also provided on the lower surface of the grip device.

The hanger 310 is suspended from the grip device 303. The hanger 310 has a gently bent and downwardly extending main portion 311 and a lower frame 312 extending generally horizontally. A lower end of the main portion 311 is joined with an approximate center of the lower frame 312. An upper end of the main body 311 is supported by the gripping device 303. The lower frame 312 is elongated in a width direction of the passenger car 320. The main stem portion 311 may be made from a tubular member having a square or rectangular cross section. The hanger 310 extends straight as viewed from its lateral side (FIG. 12). Details of the lower frame 312 are illustrated in FIG. 13 in a plan view.

Figure 13:
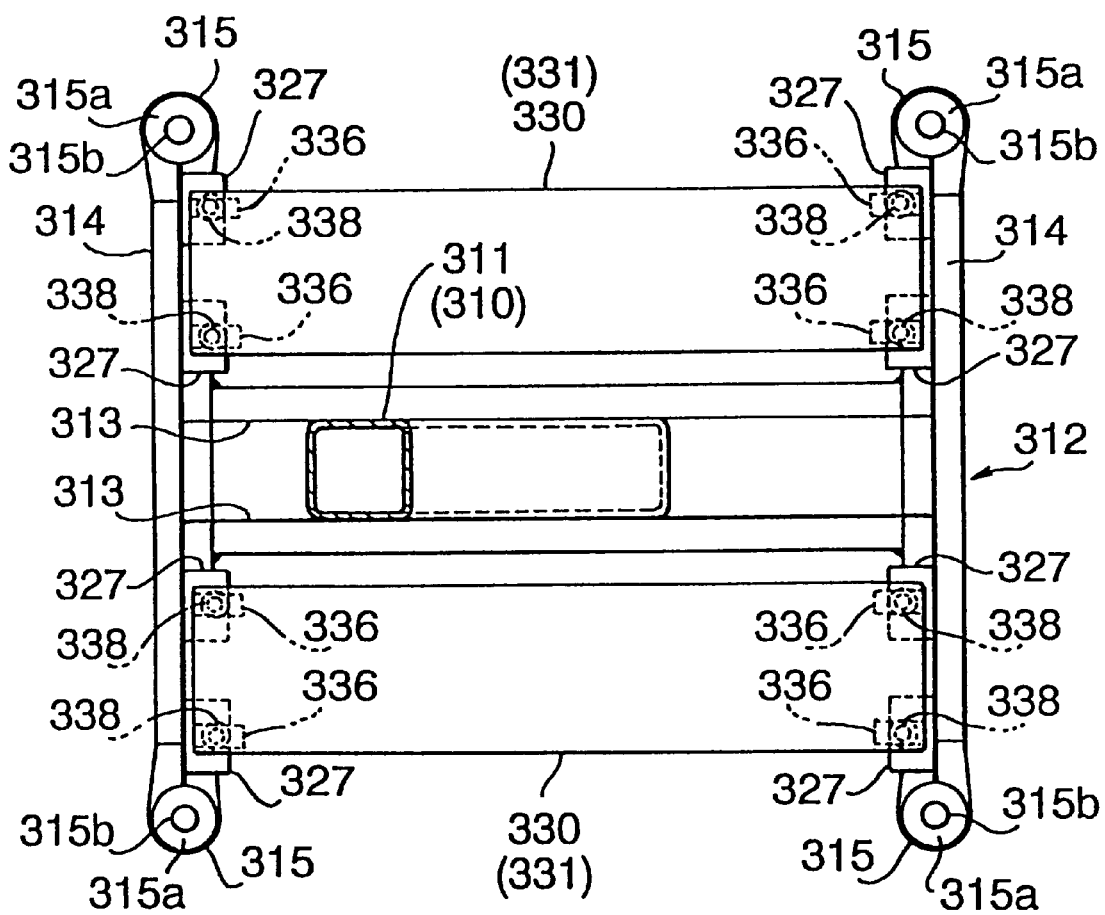
FIG. 13 depicts a plan view of the cable car showing a positional relationship between a lower frame of a hanger and the vibration damping apparatus.
Figure 14:
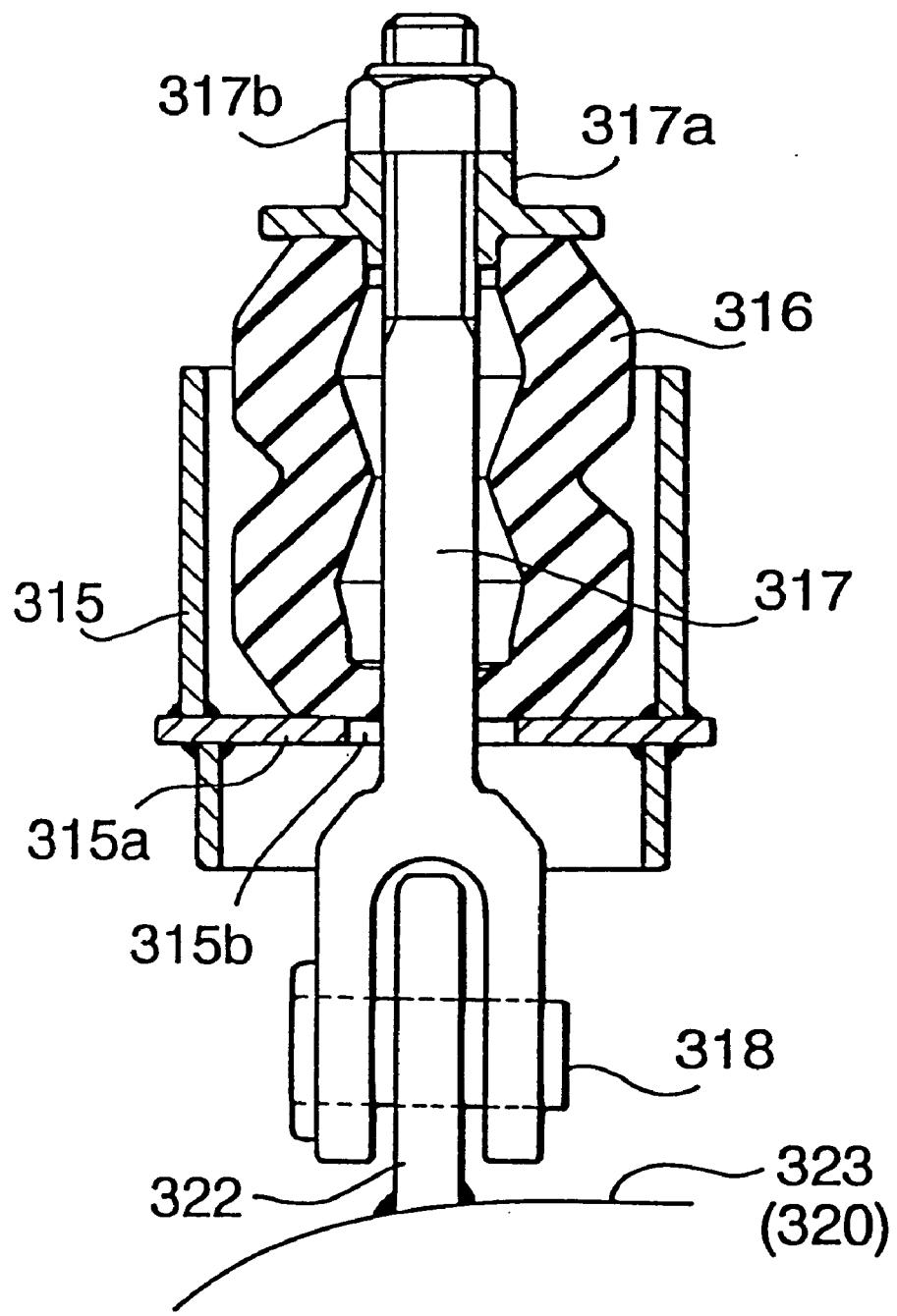
FIG. 14 is a partly sectional front view of a connection between the hanger and the top of the passenger car.

Referring to FIG. 13, the main portion 311 of the hanger 310 which is shown partly in cross section is accompanied with two horizontal transverse members 313 extending in parallel to each other in the width direction of the gondola 301. The horizontal members 313 are located at the substantially same height as the lower end of the hanger 310. The main portion 311 and the horizontal members 313 are fixed to each other. Another pair of parallel horizontal members 314 extend perpendicularly relative to the first pair of horizontal members 313 or in the length direction of the gondola 301. Ends of the first pair of horizontal members 313 are fixed to the middle of the second pair of horizontal members 314 respectively. At each end of the lengthwise member 314, mounted is a cylindrical member 315. A suspension rod 317 (will be described later: FIG. 14) vertically extends through each cylindrical member 315 to hang the carriage 320.

Referring back to FIG. 11, the passenger car 320 has a body structure 321 which includes front and rear walls as well as right and left walls of the passenger car 320. The passenger car 320 also has the roof 323 and the bottom wall 324. The passenger car 320 is a closed carriage. Like ordinary ones, the passenger car 320 has windows 325 for view watching and doors 326 for boarding (FIG. 12). Seats (not shown) are also provided in the passenger car 320.

FIG. 14 illustrates connection between the hanger 310 and the carriage 320 at one of four joints. Four connection members 322 stand upward from four corners of the roof 323 of the carriage 320 (only one connection member 322 is depicted in this illustration). The connection member 322 is a plate member. The lower frame 312 of the hanger 310 is coupled with the carriage 320 by way of these connection members 322 (FIG. 12). Each cylindrical member 315 fixed to the lower frame 312 extends vertically and has an intermediate plate 315a thereinside which extends horizontally or transversely. The resilient member 316 is placed in the cylindrical member 315 and seats on the intermediate plate 315a. An opening 315b is formed in the intermediate plate 315a at the center of the plate 315a. The cushioning member 316 has a through hole extending along its longitudinal center axis. The suspension rod 317 vertically extends through the though hole of the cushioning member 316 and the opening 315b of the intermediate plate 315a. A nut 317b and a bushing or washer 317a are provided at an upper end of the suspension rod 317 to support the suspension rod 317. The suspension rod 317 is pulled downwardly due to the weight of the carriage 320 so that the bushing 317a resiliently seats on the cushioning member 316 or the cushioning member 316 is pressed between the bushing 317a and the intermediate plate 315a of the cylindrical member 315. A lower end of the suspension rod 317 is forked. Between the forked two ends, positioned is the extension 322 fixed to the roof 323 of the carriage 320. The forked ends and the extension 322 have mating openings which are horizontally aligned when assembled. A pin 318 extends through these openings to join the suspension rod 317 and the carriage 320.

Figure 15:
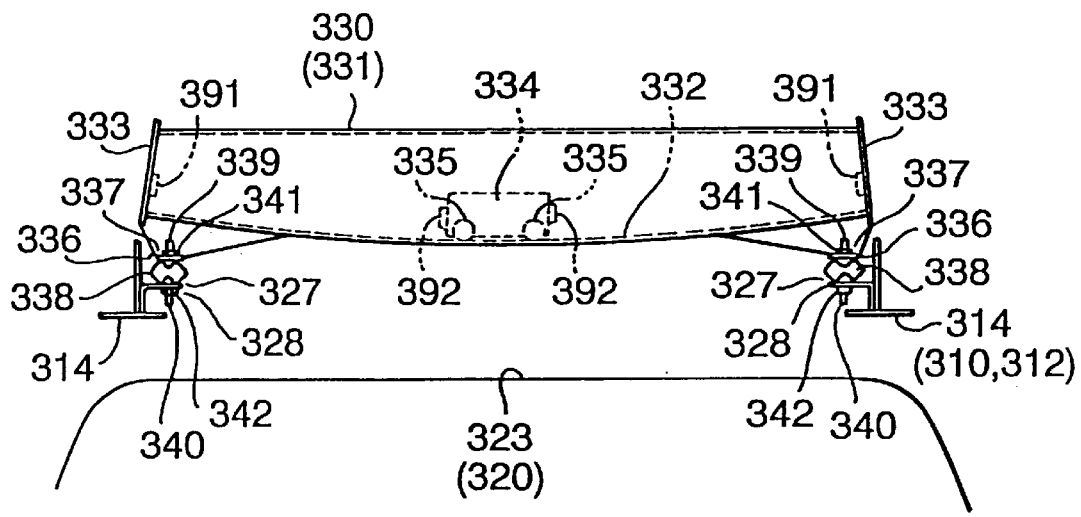
FIG. 15 illustrates a front view of the vibration damping apparatus mounted on the lower frame of the hanger.

The vibration damping device 330 of this embodiment is the same as that of the first embodiment. Therefore, its details are not described here. In FIG. 15, reference numeral 331 designates a vibration damping device casing, 332 a guide rail plate, 334 a damping weight, 335 wheels of the damping weight, 391 magnets attached to end plates of the casing 331 and 392 magnets attached to end faces of the damping weight 334.

Referring now to FIGS. 12 and 15, installation of the vibration damping device 330 will be described.

FIG. 13 illustrates the top view of the carriage 320 of the gondola 301 having the vibration damping devices 330 mounted on the lower frame 312 of the hanger 310 and FIG. 15 illustrates part of the front view of the gondola 301.

Mounting members 336 are fixed to the bottom of the damping weight housing 331 at four corners of the bottom plate 332 of each damping weight housing 331 (FIGS. 12 and 13). In the front view (FIG. 15), the downwardly projecting mounting members 336 are attached to the bottom plate 332 at longitudinal ends of the housing 331. A bore 337 is formed in each mounting member 336.

As mentioned earlier, the lower frame 312 of the hanger 310 has the two horizontal members 314 extending in the length-wise direction and in parallel to each other as illustrated in FIG. 13. Four supporting members 327 are fixed to the inner side of each horizontal member 314 at predetermined distances. The illustrated supporting member 327 has an L shape. Two on the right horizontal member 314 and two on the left horizontal member 314 are used to support one vibration damping device 330. The four pedestals 336 of the casing 331 of each vibration damping device 330 are respectively placed on the four mating supporting members 327 with a vibration absorbing element 338 being interposed therebetween (FIG. 15). Each vibration absorbing element 338 is a resilient member such as a vibration proof spring. The vibration absorbing element 338 has upper and lower bolts 339 and 340 at its top and bottom respectively. These bolts may be insert molded. Each upper bolt 339 extends through the opening 337 of the associated pedestal 336 of the damping weight housing 331 and each lower bolt 340 extends through the mating opening 328 of the supporting member 327 attached to the lower frame 312 of the hanger 312. A nut 341 fixes the housing pedestal 336 to the upper end of the vibration absorbing element 338 and another nut 342 fixes the support flange 327 to the lower end of the vibration absorbing element 338. In this manner, the vibration damping devices 330 are mounted on the lower frame 312 of the hanger 310. The two vibration damping devices 330 are installed in the same manner. As illustrated in FIG. 13, each vibration damping device 330 spans the two horizontal members 314 in the width direction of the gondola 301. The damping weight 334 oscillates in the width direction of the gondola 301, which is the oscillation direction of the gondola 301.

It should be noted that a cover for enclosing the vibration damping devices 330 may be provided. It should also be noted that the number of the vibration damping devices 330 is not limited to two. How many vibration damping devices 330 should be provided is determined depending upon the weight of the gondola 301 or environmental conditions. Only one vibration damping device may be provided if sufficient for vibration attenuation. In such a case, a counter weight may be provided to maintain a moment balance.

The vibration damping devices 330 do not extend outward from the top 323 of the gondola 320 in right and left directions as well as in front and rear directions of the gondola 320 as best seen in FIG. 13.

It should be noted that the longitudinal direction of the vibration damping device 330 (i.e., the direction in which the damping weight 334 oscillates) may not perpendicular to the cable 351. The oscillation direction of the damping weight 334 may be slant to the cable 351 as viewed from the top of the gondola 301. Means for turning the damping weight housing 331 may be provided to coincide the longitudinal direction of the housing 331 with an actual oscillation direction of the gondola 320.

Now, operations of the gondola facility 301 will be described with reference to FIG. 16.

FIG. 16 illustrates a schematic top view of a single-cable automatically circulating gondola facility 350. Its supporting means 302 is the cable gripping unit 303. Boarding or stopping stations 352 are provided at opposite positions of an elongated endless track 356 and pulleys 353 are provided at the two stations (e.g., lower and upper stations) respectively. The endless cable 351 engages over these pulleys 353 with an appropriate tension. The cable 351 circulates in the endless track 356. The cable 351 is also supported and guided by cable holding up and down devices 359 mounted on an arm 358 of a supporting tower 357 at the middle of the conveyance track 356. At the boarding stations 352, the gondola 301 moves on a boarding or slowdown rail 354 using the traveling roller 307 of the cable gripping unit 303 (FIG. 11). When the gondola 301 leaves the lower station 352, the cable gripping unit 303 firmly grips the general cable 351. The cable 351 is circularly driven so that the gondola 301 is conveyed toward the opposite station (i.e., upper station) 352. When the gondola 301 reaches the opposite station 352, the gripping unit 303 releases the conveyance cable 351 and rides on the slowdown rail 354 again. In this manner, a number of gondolas 301 are conveyed in the endless track 356.

While the gondola 301 is traveling along the conveyance track 356 and through the boarding stations 352, the cable gripper 303 and the hanger 310 of the gondola 301 approach machines and structures which are necessary for operations of the gondola 301. Therefore, a device attached to the gondola 301 should not intervene with these machines and structures. FIG. 17 illustrates the gondola 301 moving on the boarding/slowdown rail 354 in the vicinity of the boarding station 352. Generally a structure 361 is built in the boarding station 352, and a frame 355 hangs from the structure 361 to support various machines used for arrival and departure of the gondola at and from the station 352. The slowdown rail 354 is supported by the frame 355. Near the frame 355 and the passage of the gondola 301, generally provided are controllers and drive units for causing the gripper 303 to grasp and release the cable 351, for accelerating and decelerating the carriage 320, for changing the track from the main track 356 to the slowdown rail 354 and vice versa and for opening and closing the doors 326 of the carriage 320. In the present invention, the vibration damping devices 330 are placed on the lower portion of the hanger 310 above the roof 323 of the passenger car 320 and they have dimensions which do not project outward from the gondola 301 in right and left directions as well as in front and rear directions. Also, the height of the vibration damping device 330 is relatively small. Thus, the vibration damping devices 330 do not become obstructions to the surrounding facilities.

FIG. 18 illustrates the gondola 301 traveling along the main track 356 and passing by the tower 357 which supports the cable 351. The arm 358 extends horizontally from the tower 357 from the top of the tower 357, and the cable holding up and down device 359 is mounted at a free end of the arm 358. The cable holding up and down device 359 has a plurality of rollers or wheels 360 to guide and support the cable 351 in the main track 356. The gripper 305 of the cable gripping unit 303 grasps the cable 351. When the gondola 301 passes over the cable holding up and down device 359, the gripper 305 is guided by peripheral edges of each wheel 360. The gripper 305 is firmly holding the cable 351 during this movement. The vibration damping devices 330 pass by the tower 357, the arm 358 and the cable holding up and down device 359 with a sufficient clearance since they are mounted on the lower frame of the hanger 310 near the roof 323 of the carriage 320.

The gondola 301 rolls having the center of rolling on the cable 351 or the supporting device 303 like a pendulum upon a wind (external force). The center of gravity of the gondola 301 generally coincides with the center of the passenger car 320 although it varies with the number of the people on board. The gondola 301 performs an oscillation having a natural period determined by the distance from the center of gravity to the rolling center. Generally the vibration damping device 330 should not be placed at the center of gravity of the gondola 301 to achieve a sufficient damping effect. The location of the vibration damping devices 330 in this embodiment is the above the top 323 of the carriage 320 so that it is deviated upward from the center of gravity of the gondola 301. Therefore, the illustrated vibration damping devices 330 are able to demonstrate a sufficient damping effect. By changing the radius of curvature of the arcuate rail plate of the vibration damping device 330, it is possible to arbitrarily determine the natural period of the vibration damping device. Thus, an appropriate attenuation effect can be realized.

It should be noted that the present invention is not limited to the above embodiment. The present invention is applicable to any type of ropeway facility.

Fourth Embodiment

A fourth embodiment of the present invention will be described with reference to FIG. 19. This embodiment deals with a reversible aerial tramway facility 450 which uses a traveling unit 403 as a supporting device 402.

Referring to FIG. 19, a gondola 401 includes the traveling device 403 (i.e., the supporting means 402) placed on cables 451 and 452, a hanger 410 suspended from the cable traveling device 403, a passenger car 420 suspended from the hanger 410 and a pair of parallel vibration damping devices 430 mounted on a lower frame 412 of the hanger 410 above a roof 423 of the passenger car 420. The traveling device 403 includes a plurality of wheels 407 which are rotatably supported by parallel beams 404 extending horizontally at the head portion 410*a* of the hanger 410. (FIG. 19 shows only one of them.) The wheels 407 simply ride on the stationary cable 451 and roll thereon upon application of a pulling force to the gondola 401. The drive cables 452 are pulled by a separate drive when the gondola should be moved. Connections 405 to the drive cables 452 from the gondola are also supported by the shafts 404. The cables 452 is a traction means. In the front view, the wheels 407 are located between the connections 405. The generally C-shaped head portion 410*a* of the hanger 410 supports the traveling device 403. A main body 411 of the hanger 410 downwardly extends from the head portion 410*a* until its lower frame 412. The lower frame 412 generally extends horizontally. A carriage 420 of the gondola 401 has protruding rods 417 on the roof 423 and these rods 417 are suspended from the lower frame 412. The lower frame 412 has a similar structure to that of the third embodiment (FIG. 13) and the vibration damping devices 430 are mounted on the lower frame 412 in the same manner as the previous embodiment. Other details of this embodiment are also the same as the third embodiment. Numeral 434 designates a damping weight, 432 is a rail plate, 414 supporting members of the lower frame, 431 a damping weight housing and 456 a conveyance track.

Fifth Embodiment

Figure 20:
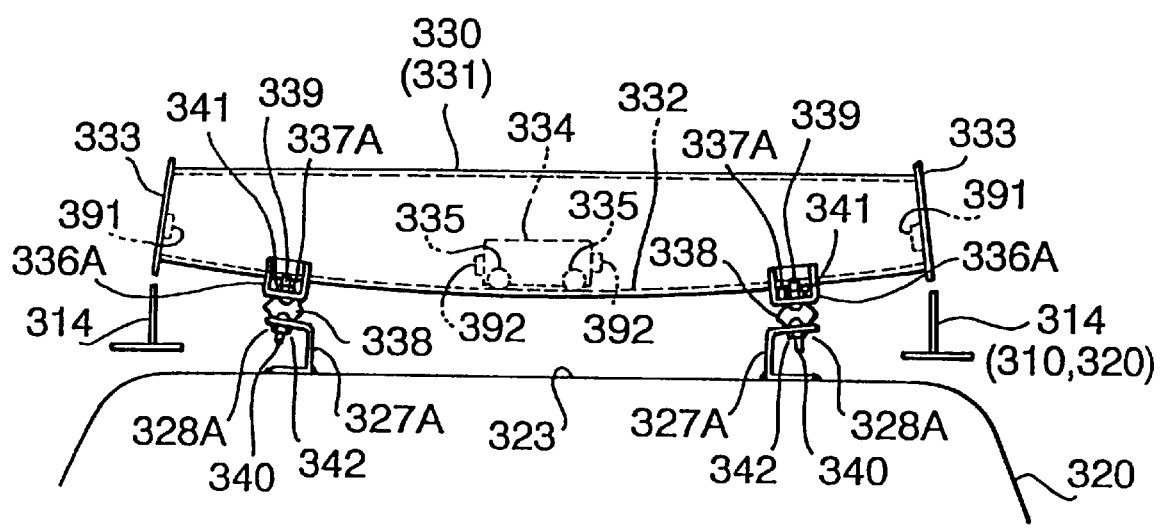
FIG. 20 is an enlarged front view of a vibration damping device mounted on a roof of a cable car according to a fifth embodiment of the present invention.

A fifth embodiment of the present invention will be described with reference to FIG. 20. This embodiment deals with a single-cable automatically circulating gondola facility. A fundamental construction of the gondola is the same as the third embodiment which is illustrated in FIGS. 11 and 12. The difference is illustrated in FIG. 20. Specifically, the vibration damping devices are mounted on the roof 323 of the carriage 320 by way of cushion members and channel members in this embodiment.

Mounting channel members 327A are provided on the roof 323 of the carriage 320. Openings 328A are formed in the mounting members 327A. The housing 331 of the vibration damping device 330 has downwardly projecting elements 336A on its lower portion. Openings 337A are formed in these elements 336A. Each cushioning member 338 has the upper and lower bolts 339 and 340. Each upper bolt 339 extends through the opening 337A of the projecting member 336A of the damping weight housing 331 and the nut 341 fixes the top of the cushioning member to the projection member 336A. Each lower bolt 340 extends through the opening 328A of the mounting member 327A of the carriage 320 and the nut 342 fixes the bottom of the cushioning member to the mounting member 327A. In this manner, the vibration damping devices 330 are mounted on the carriage roof 323. This way of mounting is applicable to any type of ropeway facility.

What is claimed is:

1. A vibration damping arrangement for a cable car of a type having a hanger device suspended from a cable and a carriage suspended from the hanger device, the carriage having a seat therein, the vibration damping arrangement comprising:

a downwardly arcuate track adapted to be located under the seat inside the carriage;

a vibration damping body movably located on the arcuate track such that it can perform a simple harmonic oscillation along the track in the longitudinal direction of the arcuate track upon vibrations of the carriage, the damping body having first and second end faces in the longitudinal direction of the arcuate track; and cushioning members provided on longitudinal ends of the arcuate track, or on said first and second end faces of the damping body, or on both of the longitudinal ends of the arcuate track and said first and second end faces of the damping body, wherein a natural period of the vibration damping body is minus shifted from a natural period of the carriage by several percent to several times ten percent if the vibration damping arrangement is mounted on the cable car and a degree of freedom of a total vibrant system becomes two.

2. The vibration damping arrangement of claim 1, wherein the cushion members are spring cushion members.

3. The vibration damping arrangement of claim 1 wherein the spring cushion members are attached to the first and second end faces of the damping body.

4. The vibration damping arrangement of claim 3 wherein the spring cushion members are coil springs.

5. The vibration damping arrangement of claim 4 wherein rubber is attached to a free end of the spring cushion members.

6. The vibration damping arrangement of claim 1, wherein the cushion members are rubber cushion members.

7. The vibration damping arrangement of claim 1, wherein the cushion members are gel cushion members.

8. The vibration damping arrangement of claim 1, wherein the arcuate track includes a plurality of straight lengths.

9. The vibration damping arrangement of claim 1, wherein the longitudinal direction of the arcuate track is generally perpendicular to the cable as viewed from the top.

10. A vibration damping arrangement for a cable car of a type having a hanger device suspended from a cable and a carriage suspended from the hanger device, the carriage having a width, a length and a bottom, the vibration damping arrangement comprising:

a downwardly arcuate track adapted to be suspended from the bottom of the carriage in such a manner that it does not extend over the width and length of the carriage;

a vibration damping body movably located on the arcuate track such that it can perform a simple harmonic oscillation along the track in the longitudinal direction of the arcuate track upon vibrations of the carriage, the damping body having first and second end faces in the longitudinal direction of the arcuate track; and cushioning members provided on longitudinal ends of the arcuate track, or on said first and second end faces of the damping body, or on both of the longitudinal ends of the arcuate track and said first and second end faces of the damping body, wherein a natural period of the vibration damping body is minus shifted from a natural period of the carriage by several percent to several times ten percent if the vibration damping arrangement is mounted on the cable car and a degree of freedom of a total vibrant system becomes two.

11. The vibration damping arrangement of claim 10, wherein the cushion members are spring cushion members.

12. The vibration damping arrangement of claim 11 wherein the spring cushion members are attached to the first and second end faces of the damping body.

13. The vibration damping arrangement of claim 12 wherein the spring cushion members are coil springs.

14. The vibration damping arrangement of claim 13 wherein rubber is attached to a free end of the spring cushion members.

15. The vibration damping arrangement of claim 10, wherein the cushion members are rubber cushion members.

16. The vibration damping arrangement of claim 10, wherein the cushion members are gel cushion members.

17. The vibration damping arrangement of claim 10, wherein the arcuate track includes a plurality of straight lengths.

18. The vibration damping arrangement of claim 10, wherein the longitudinal direction of the arcuate track is generally perpendicular to the cable as viewed from the top.

19. A vibration damping arrangement for a cable car of a type having a hanger device suspended from a cable and a carriage suspended from the hanger device, the carriage having a width, a length and a top, the vibration damping arrangement comprising:

a downwardly arcuate track adapted to be supported by the hanger device above the top of the carriage in such a manner that it does not extend over the width and length of the carriage; and a vibration damping body movably located on the arcuate track such that it can perform a simple harmonic oscillation along the track in the longitudinal direction of the arcuate track upon vibrations of the carriage, the damping body having first and second end faces in the longitudinal direction of the track; and cushioning members provided on longitudinal ends of the arcuate track, or on said first and second end faces of the damping body, or on both of the longitudinal ends of the track and said first and second end faces of the damping body, wherein a natural period of the vibration damping body is minus shifted from a natural period of the carriage by several percent to several times ten percent if the vibration damping arrangement is mounted on the cable car and a degree of freedom of a total vibrant system becomes two.

20. The vibration damping arrangement of claim 19, wherein the cushion members are spring cushion members.

21. The vibration damping arrangement of claim 20 wherein the spring cushion members are attached to the first and second end faces of the damping body.

22. A The vibration damping arrangement of claim 21 wherein the spring cushion members are coil springs.

23. The vibration damping arrangement of claim 22 wherein rubber is attached to a free end of the spring cushion members.

24. The vibration damping arrangement of claim 19, wherein the cushion members are rubber cushion members.

25. The vibration damping arrangement of claim 19, wherein the cushion members are gel cushion members.

26. The vibration damping arrangement of claim 19, wherein the arcuate track includes a plurality of straight lengths.

27. The vibration damping arrangement of claim 19, wherein the longitudinal direction of the arcuate track is generally perpendicular to the cable as viewed from the top.

28. A vibration damping arrangement for a cable car of a type having a hanger device suspended from a cable and a carriage suspended from the hanger device, the carriage having a width, a length and a top, the vibration damping arrangement comprising:

a downwardly arcuate track adapted to be mounted on the top of the carriage in such a manner that it does not extend over the width and length of the carriage; and a vibration damping body movably located on the arcuate track such that it can perform a simple harmonic oscillation along the track in the longitudinal direction of the arcuate track upon vibrations of the carriage, the damping body having first and second end faces in the longitudinal direction of the arcuate track; and cushioning members provided on longitudinal ends of the arcuate track, or on said first and second end faces of the damping body, or on both of the longitudinal ends of the arcuate track and said first and second end faces of the damping body, wherein a natural period of the vibration damping body is minus shifted from a natural period of the carriage by several percent to several times ten percent if the vibration damping arrangement is mounted on the cable car and a degree of freedom of a total vibrant system becomes two.

29. The vibration damping arrangement of claim 28, wherein the cushion members are spring cushion members.

30. The vibration damping arrangement of claim 29 wherein the spring cushion members are attached to the first and second end faces of the damping body.

31. The vibration damping arrangement of claim 30 wherein the spring cushion members are coil springs.

32. The vibration damping arrangement of claim 31 wherein rubber is attached to a free end of the spring cushion members.

33. The vibration damping arrangement of claim 28, wherein the cushion members are rubber cushion members.

34. The vibration damping arrangement of claim 28, wherein the cushion members are gel cushion members.

35. The vibration damping arrangement of claim 28, wherein the arcuate track includes a plurality of straight lengths.

36. The vibration damping arrangement of claim 28, wherein the longitudinal direction of the arcuate track is generally perpendicular to the cable as viewed from the top.

* * * * *